US011290682B1

(12) United States Patent
Shaburov et al.

(10) Patent No.: US 11,290,682 B1
(45) Date of Patent: *Mar. 29, 2022

(54) BACKGROUND MODIFICATION IN VIDEO CONFERENCING

(71) Applicant: Snap Inc., Santa Monica, CA (US)

(72) Inventors: Victor Shaburov, Castro Valley, CA (US); Yurii Monastyrshyn, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/141,588

(22) Filed: Sep. 25, 2018

Related U.S. Application Data

(63) Continuation of application No. 14/987,514, filed on Jan. 4, 2016, now Pat. No. 10,116,901, which is a
(Continued)

(51) Int. Cl.
*H04N 7/15* (2006.01)
*G06T 7/38* (2017.01)
(Continued)

(52) U.S. Cl.
CPC ........... *H04N 7/15* (2013.01); *G06K 9/00228* (2013.01); *G06K 9/00711* (2013.01);
(Continued)

(58) Field of Classification Search
CPC ........... G06K 9/00228; G06K 9/00711; G06K 2009/4666; G06T 5/002; G06T 7/38;
(Continued)

(56) References Cited

U.S. PATENT DOCUMENTS

| 4,888,713 A | | 12/1989 | Falk | |
|---|---|---|---|---|
| 5,227,863 A | * | 7/1993 | Bilbrey | H04N 5/262 348/578 |

(Continued)

FOREIGN PATENT DOCUMENTS

| CA | 2887596 A1 | 7/2015 |
|---|---|---|
| CN | 1411277 A | 4/2003 |

(Continued)

OTHER PUBLICATIONS

"U.S. Appl. No. 14/661,367, Non Final Office Action dated May 5, 2015", 30 pgs.

(Continued)

*Primary Examiner* — Hemant S Patel
(74) *Attorney, Agent, or Firm* — Schwegman Lundberg & Woessner, P.A.

(57) ABSTRACT

Methods and systems for real-time video processing can be used in video conferencing to modify image quality of background. One example method includes the steps of receiving a video including a sequence of images, identifying at least one object of interest (e.g., a face) in one or more of the images, detecting feature reference points of the at least one object of interest, and tracking the at least one object of interest in the video. The tracking may comprise aligning a virtual face mesh to the at least one object of interest in one or more of the images. Further, a background is identified in the images by separating the at least one object of interest from each image based on the virtual face mesh. The background is then modified in each of the images by blurring, changing a resolution, colors, or other parameters.

20 Claims, 12 Drawing Sheets

Related U.S. Application Data continuation of application No. 14/661,367, filed on Mar. 18, 2015, now Pat. No. 9,232,189.

(51) Int. Cl.
*G06T 19/00* (2011.01)
*G06K 9/00* (2006.01)
*G06T 5/00* (2006.01)
*G06K 9/46* (2006.01)

(52) U.S. Cl.
CPC ............... *G06T 5/002* (2013.01); *G06T 7/38* (2017.01); *G06T 19/006* (2013.01); *H04N 7/157* (2013.01); *G06K 2009/4666* (2013.01); *G06T 2207/10024* (2013.01); *G06T 2207/20036* (2013.01); *G06T 2207/20124* (2013.01); *G06T 2207/20182* (2013.01)

(58) Field of Classification Search
CPC ......... G06T 19/006; G06T 2207/10024; G06T 2207/20036; G06T 2207/20124; G06T 2207/20182; H04N 7/15; H04N 7/157
USPC ........................................ 348/14.01–14.16
See application file for complete search history.

(56) References Cited

U.S. PATENT DOCUMENTS

| | | | |
|---|---|---|---|
| 5,359,706 A | 10/1994 | Sterling | |
| 5,479,603 A | 12/1995 | Stone et al. | |
| 5,715,382 A * | 2/1998 | Herregods | H04N 1/3872 358/1.18 |
| 6,038,295 A | 3/2000 | Mattes | |
| 6,252,576 B1 | 6/2001 | Nottingham | |
| H2003 H | 11/2001 | Minner | |
| 6,621,939 B1 | 9/2003 | Negishi et al. | |
| 6,664,956 B1 * | 12/2003 | Erdem | G06T 17/20 345/419 |
| 6,768,486 B1 | 7/2004 | Szabo et al. | |
| 6,807,290 B2 | 10/2004 | Liu et al. | |
| 6,829,391 B2 * | 12/2004 | Comaniciu | G06T 9/001 382/232 |
| 6,897,977 B1 | 5/2005 | Bright | |
| 6,980,909 B2 | 12/2005 | Root et al. | |
| 7,034,820 B2 | 4/2006 | Urisaka et al. | |
| 7,035,456 B2 | 4/2006 | Lestideau | |
| 7,039,222 B2 | 5/2006 | Simon et al. | |
| 7,050,078 B2 | 5/2006 | Dempski | |
| 7,119,817 B1 | 10/2006 | Kawakami | |
| 7,167,519 B2 * | 1/2007 | Comaniciu | H04N 19/23 375/240.08 |
| 7,173,651 B1 | 2/2007 | Knowles | |
| 7,212,656 B2 | 5/2007 | Liu et al. | |
| 7,227,567 B1 * | 6/2007 | Beck | H04N 7/147 348/14.01 |
| 7,239,312 B2 | 7/2007 | Urisaka et al. | |
| 7,411,493 B2 | 8/2008 | Smith | |
| 7,415,140 B2 | 8/2008 | Nagahashi et al. | |
| 7,535,890 B2 | 5/2009 | Rojas | |
| 7,564,476 B1 | 7/2009 | Coughlan et al. | |
| 7,612,794 B2 * | 11/2009 | He | H04N 7/147 348/14.07 |
| 7,697,787 B2 | 4/2010 | Illsley | |
| 7,710,608 B2 | 5/2010 | Takahashi | |
| 7,720,283 B2 | 5/2010 | Sun et al. | |
| 7,812,993 B2 | 10/2010 | Bright | |
| 7,830,384 B1 | 11/2010 | Edwards et al. | |
| 7,945,653 B2 | 5/2011 | Zuckerberg et al. | |
| 8,026,931 B2 | 9/2011 | Sun et al. | |
| 8,131,597 B2 | 3/2012 | Hudetz | |
| 8,199,747 B2 | 6/2012 | Rojas et al. | |
| 8,230,355 B1 | 7/2012 | Bauermeister et al. | |
| 8,233,789 B2 | 7/2012 | Brunner | |
| 8,253,789 B2 | 8/2012 | Aizaki et al. | |
| 8,294,823 B2 | 10/2012 | Ciudad et al. | |
| 8,295,557 B2 | 10/2012 | Wang et al. | |
| 8,296,456 B2 | 10/2012 | Klappert | |
| 8,314,842 B2 | 11/2012 | Kudo | |
| 8,332,475 B2 | 12/2012 | Rosen et al. | |
| 8,335,399 B2 | 12/2012 | Gyotoku | |
| 8,421,873 B2 * | 4/2013 | Majewicz | G03B 15/05 348/139 |
| 8,462,198 B2 | 6/2013 | Lin et al. | |
| 8,638,993 B2 * | 1/2014 | Lee | G06K 9/00234 382/118 |
| 8,687,039 B2 | 4/2014 | Degrazia et al. | |
| 8,692,830 B2 | 4/2014 | Nelson et al. | |
| 8,717,465 B2 | 5/2014 | Ning | |
| 8,718,333 B2 | 5/2014 | Wolf et al. | |
| 8,724,622 B2 | 5/2014 | Rojas | |
| 8,743,210 B2 | 6/2014 | Lin | |
| 8,761,497 B2 | 6/2014 | Berkovich et al. | |
| 8,766,983 B2 | 7/2014 | Marks et al. | |
| 8,810,696 B2 | 8/2014 | Ning | |
| 8,824,782 B2 | 9/2014 | Ichihashi et al. | |
| 8,874,677 B2 | 10/2014 | Rosen et al. | |
| 8,909,679 B2 | 12/2014 | Roote et al. | |
| 8,929,614 B2 | 1/2015 | Oicherman et al. | |
| 8,934,665 B2 | 1/2015 | Kim et al. | |
| 8,958,613 B2 | 2/2015 | Kondo et al. | |
| 8,988,490 B2 | 3/2015 | Fujii | |
| 8,995,433 B2 | 3/2015 | Rojas | |
| 9,032,314 B2 | 5/2015 | Mital et al. | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,232,189 B2 * | 1/2016 | Shaburov | H04N 7/15 |
| 9,364,147 B2 | 6/2016 | Wakizaka et al. | |
| 9,396,525 B2 | 7/2016 | Shaburova et al. | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,565,362 B2 | 2/2017 | Kudo | |
| 9,928,874 B2 | 3/2018 | Shaburova | |
| 10,116,901 B2 * | 10/2018 | Shaburov | H04N 7/157 |
| 10,255,948 B2 | 4/2019 | Shaburova et al. | |
| 10,283,162 B2 | 5/2019 | Shaburova et al. | |
| 10,438,631 B2 | 10/2019 | Shaburova et al. | |
| 10,566,026 B1 | 2/2020 | Shaburova | |
| 10,586,570 B2 | 3/2020 | Shaburova et al. | |
| 10,950,271 B1 | 3/2021 | Shaburova et al. | |
| 10,991,395 B1 | 4/2021 | Shaburova et al. | |
| 2002/0012454 A1 | 1/2002 | Liu et al. | |
| 2002/0064314 A1 | 5/2002 | Comaniciu et al. | |
| 2003/0107568 A1 | 6/2003 | Urisaka et al. | |
| 2003/0228135 A1 | 12/2003 | Illsley | |
| 2004/0037475 A1 | 2/2004 | Avinash et al. | |
| 2004/0076337 A1 | 4/2004 | Nishida | |
| 2004/0119662 A1 | 6/2004 | Dempski | |
| 2004/0130631 A1 | 7/2004 | Suh | |
| 2004/0233223 A1 | 11/2004 | Schkolne et al. | |
| 2005/0046905 A1 | 3/2005 | Aizaki et al. | |
| 2005/0073585 A1 * | 4/2005 | Ettinger | H04N 7/18 348/155 |
| 2005/0117798 A1 | 6/2005 | Patton et al. | |
| 2005/0128211 A1 | 6/2005 | Berger et al. | |
| 2005/0131744 A1 | 6/2005 | Brown et al. | |
| 2005/0180612 A1 | 8/2005 | Nagahashi et al. | |
| 2005/0190980 A1 | 9/2005 | Bright | |
| 2005/0202440 A1 | 9/2005 | Fletterick et al. | |
| 2005/0220346 A1 | 10/2005 | Akahori | |
| 2005/0238217 A1 | 10/2005 | Enomoto et al. | |
| 2006/0170937 A1 | 8/2006 | Takahashi | |
| 2006/0227997 A1 | 10/2006 | Au et al. | |
| 2006/0242183 A1 | 10/2006 | Niyogi et al. | |
| 2007/0013709 A1 | 1/2007 | Charles et al. | |
| 2007/0087352 A9 | 4/2007 | Fletterick et al. | |
| 2007/0140556 A1 | 6/2007 | Willamowski et al. | |
| 2007/0159551 A1 | 7/2007 | Kotani | |
| 2007/0216675 A1 | 9/2007 | Sun et al. | |

(56) References Cited

U.S. PATENT DOCUMENTS

| | | |
|---|---|---|
| 2007/0258656 A1 | 11/2007 | Aarabi et al. |
| 2007/0268312 A1 | 11/2007 | Marks et al. |
| 2008/0077953 A1* | 3/2008 | Fernandez ............... H04N 7/15 725/32 |
| 2008/0184153 A1 | 7/2008 | Matsumura et al. |
| 2008/0187175 A1 | 8/2008 | Kim et al. |
| 2008/0204992 A1 | 8/2008 | Swenson et al. |
| 2008/0212894 A1 | 9/2008 | Demirli et al. |
| 2009/0158170 A1 | 6/2009 | Narayanan et al. |
| 2009/0309878 A1* | 12/2009 | Otani ................. G06K 9/00208 345/427 |
| 2010/0177981 A1 | 7/2010 | Wang et al. |
| 2010/0185963 A1 | 7/2010 | Silk et al. |
| 2010/0188497 A1 | 7/2010 | Aizaki et al. |
| 2010/0203968 A1 | 8/2010 | Gill et al. |
| 2011/0018875 A1 | 1/2011 | Arahari et al. |
| 2011/0038536 A1 | 2/2011 | Gong |
| 2011/0202598 A1 | 8/2011 | Evans et al. |
| 2011/0273620 A1 | 11/2011 | Berkovich et al. |
| 2011/0299776 A1 | 12/2011 | Lee et al. |
| 2012/0050323 A1 | 3/2012 | Baron, Jr. et al. |
| 2012/0106806 A1 | 5/2012 | Folta et al. |
| 2012/0136668 A1 | 5/2012 | Kuroda |
| 2012/0144325 A1 | 6/2012 | Mital et al. |
| 2012/0167146 A1 | 6/2012 | Incorvia |
| 2012/0209924 A1 | 8/2012 | Evans et al. |
| 2012/0288187 A1 | 11/2012 | Ichihashi et al. |
| 2012/0306853 A1 | 12/2012 | Wright et al. |
| 2012/0327172 A1 | 12/2012 | El-saban et al. |
| 2013/0004096 A1 | 1/2013 | Goh et al. |
| 2013/0114867 A1 | 5/2013 | Kondo et al. |
| 2013/0155169 A1 | 6/2013 | Hoover et al. |
| 2013/0190577 A1 | 7/2013 | Brunner et al. |
| 2013/0201105 A1 | 8/2013 | Ptucha et al. |
| 2013/0201187 A1 | 8/2013 | Tong et al. |
| 2013/0208129 A1 | 8/2013 | Stenman |
| 2013/0216094 A1 | 8/2013 | Delean |
| 2013/0229409 A1 | 9/2013 | Song et al. |
| 2013/0235086 A1 | 9/2013 | Otake |
| 2013/0287291 A1 | 10/2013 | Cho |
| 2013/0342629 A1 | 12/2013 | North et al. |
| 2014/0043329 A1 | 2/2014 | Wang et al. |
| 2014/0198177 A1 | 7/2014 | Castellani et al. |
| 2014/0228668 A1 | 8/2014 | Wakizaka et al. |
| 2015/0097834 A1 | 4/2015 | Ma et al. |
| 2015/0116448 A1 | 4/2015 | Gottlieb |
| 2015/0131924 A1 | 5/2015 | He et al. |
| 2015/0145992 A1 | 5/2015 | Traff |
| 2015/0163416 A1 | 6/2015 | Nevatie |
| 2015/0195491 A1 | 7/2015 | Shaburov et al. |
| 2015/0213604 A1 | 7/2015 | Li et al. |
| 2015/0220252 A1 | 8/2015 | Mital et al. |
| 2015/0221069 A1 | 8/2015 | Shaburova et al. |
| 2015/0221118 A1 | 8/2015 | Shaburova |
| 2015/0221136 A1 | 8/2015 | Shaburova et al. |
| 2015/0221338 A1 | 8/2015 | Shaburova et al. |
| 2015/0222821 A1 | 8/2015 | Shaburova |
| 2016/0322079 A1 | 11/2016 | Shaburova et al. |
| 2017/0019633 A1 | 1/2017 | Shaburov et al. |
| 2018/0036481 A1 | 12/2018 | Parshionikar |
| 2020/0160886 A1 | 5/2020 | Shaburova |
| 2021/0166732 A1 | 6/2021 | Shaburova et al. |

FOREIGN PATENT DOCUMENTS

| | | |
|---|---|---|
| CN | 1811793 A | 8/2006 |
| CN | 101167087 A | 4/2008 |
| CN | 101499128 A | 8/2009 |
| CN | 101753851 A | 6/2010 |
| CN | 102665062 A | 9/2012 |
| CN | 103620646 A | 3/2014 |
| CN | 103650002 A | 3/2014 |
| CN | 103999096 A | 8/2014 |
| CN | 104378553 A | 2/2015 |
| CN | 107637072 A | 1/2018 |
| KR | 20040058671 | 7/2004 |
| KR | 100853122 B1 | 8/2008 |
| KR | 20080096252 | 10/2008 |
| KR | 102031135 B1 | 10/2019 |
| WO | WO-2016149576 A1 | 9/2016 |

OTHER PUBLICATIONS

"U.S. Appl. No. 14/661,367, Notice of Allowance dated Aug. 31, 2015", 5 pgs.

"U.S. Appl. No. 14/661,367. Response filed Aug. 5, 2015 to Non Final Office Action dated May 5, 2015", 17 pgs.

"U.S. Appl. No. 14/987,514, Final Office Action dated Sep. 26, 2017", 25 pgs.

"U.S. Appl. No. 14/987,514, Non Final Office Action dated Jan. 18, 2017", 35 pgs.

"U.S. Appl. No. 14/987,514, Notice of Allowance dated Jun. 29, 2018", 9 pgs.

"U.S. Appl. No. 14/987,514, Response filed Feb. 26, 2018 to Final Office Action dated Sep. 26, 2017", 15 pgs.

"U.S. Appl. No. 14/987,514, Response filed Jul. 18, 2017 to Non Final Office Action dated Jan. 18, 2017", 15 pgs.

"U.S. Appl. No. 14/987,514, Preliminary Amendment filed Jan. 4, 2016", 3 pgs.

"European Application Serial No. 16716975.4, Response filed May 4, 2018 to Communication pursuant to Rules 161(1) and 162 EPC dated Oct. 25, 2017", w/ English Claims, 116 pgs.

"International Application Serial No. PCT/US2016/023046, International Preliminary Report on Patentability dated Sep. 28, 2017", 8 pgs.

"International Application Serial No. PCT/US2016/023046, International Search Report dated Jun. 29, 2016", 4 pgs.

"International Application Serial No. PCT/US2016/023046, Written Opinion dated Jun. 29, 2016", 6 pgs.

Annika, Kuhl, et al., "Automatic Fitting of a Deformable Face Mask Using a Single Image", Computer Vision/Computer Graphics Collaboration Techniques, Springer, Berlin (May 4, 2009), 13 pgs.

Leyden, John, "This SMS will self-destruct in 40 seconds", URL: http://www.theregister.co.uk/2005/12/12/stealthtext/, (Dec. 12, 2005), 1 pg.

Pham, Hai, et al., "Hybrid On-line 3D Face and Facial Actions Tracking in RGBD Video Sequences", International Conference on Pattern Recognition, IEEE Computer Society, US, (Aug. 24, 2014), 4194-4199.

"Korean Application Serial No. 10-2017-7029496, Response filed Mar. 28, 2019 to Notice of Preliminary Rejection dated Jan. 29, 2019", w/ English Claims, 28 pgs.

"Korean Application Serial No. 10-2017-7029496, Notice of Preliminary Rejection dated Jan. 29, 2019", w/ English Translation, 11 pgs.

"Chinese Application Serial No. 201680028853.3, Office Action dated Aug. 19, 2019", w/English Translation, 20 pgs.

"Chinese Application Serial No. 201680028853.3, Response filed Dec. 6, 2019 to Office Action dated Aug. 19, 2019", w/English Claims, 16 pgs.

"Korean Application Serial No. 10-2019-7029221, Notice of Preliminary Rejection dated Jan. 6, 2020", w/ English Translation, 13 pgs.

"Chinese Application Serial No. 201680028853.3, Office Action dated May 6, 2020", w/English Translation, 22 pgs.

Viola, Paul, et al., "Rapid Object Detection using a Boosted Cascade of Simple Features", IEEE Conference on Computer Vision and Pattern Recognition (CVPR), (2001), 511-518.

"Chinese Application Serial No. 201680028853.3, Response filed Jun. 23, 2020 to Office Action dated May 6, 2020", w/ English Claims, 17 pgs.

"European Application Serial No. 16716975.4, Communication Pursuant to Article 94(3) EPC dated Mar. 31, 2020", 8 pgs.

"Korean Application Serial No. 10-2019-7029221, Response filed Mar. 6, 2020 to Notice of Preliminary Rejection dated Jan. 6, 2020", w/ English Claims, 19 pgs.

(56) References Cited

OTHER PUBLICATIONS

"European Application Serial No. 16716975.4, Response Filed Jul. 31, 2020 to Communication Pursuant to Article 94(3) EPC dated Mar. 31, 2020", 64 pgs.

"Korean Application Serial No. 10-2020-7031217, Notice of Preliminary Rejection ddated Jan. 21, 2021", w/ English Translation, 9 pgs.

"Chinese Application Serial No. 201680028853.3, Office Action dated Apr. 2, 2021", w/ English translation, 10 pgs.

"Chinese Application Serial No. 201680028853.3,Response filed Feb. 4, 2021 to Office Action dated Dec. 1, 2020", w/ English Claims, 17 pgs.

"European Application Serial No. 16716975.4, Summons to Attend Oral Proceedings mailed Apr. 16, 2021", 11 pgs.

"European Application Serial No. 16716975.4, Summons to Attend Oral Proceedings mailed Sep. 15, 2021", 4 pgs.

"European Application Serial No. 16716975.4, Written Submissions filed Aug. 10, 2021 to Summons to Attend Oral Proceedings mailed Apr. 16, 21", 62 pgs.

"Korean Application Serial No. 10-2020-7031217, Response filed May 6, 2021 to Notice of Preliminary Rejection dated Jan. 21, 2021", w/ English Claims, 20 pgs.

"Chinese Application Serial No. 201680028853.3, Office Action dated Dec. 1, 2020", w/ English Translation, 20 pgs.

"U.S. Appl. No. 14/114,124, Response filed Oct. 5, 2016 to Final Office Action dated May 5, 2016", 14 pgs.

"U.S. Appl. No. 14/314,312, Advisory Action dated May 10, 2019", 3 pgs.

"U.S. Appl. No. 14/314,312, Appeal Brief filed Oct. 3, 2019", 14 pgs.

"U.S. Appl. No. 14/314,312, Final Office Action dated Mar. 22, 2019", 28 pgs.

"U.S. Appl. No. 14/314,312, Final Office Action dated Apr. 12, 2017", 34 pgs.

"U.S. Appl. No. 14/314,312, Final Office Action dated May 5, 2016", 28 pgs.

"U.S. Appl. No. 14/314,312, Final Office Action dated May 10, 2018", 32 pgs.

"U.S. Appl. No. 14/314,312, Non Final Office Action dated Jul. 5, 2019", 25 pgs.

"U.S. Appl. No. 14/314,312, Non Final Office Action dated Aug. 30, 2017", 32 pgs.

"U.S. Appl. No. 14/314,312, Non Final Office Action dated Oct. 17, 2016", 33 pgs.

"U.S. Appl. No. 14/314,312, Non Final Office Action dated Nov. 5, 2015", 26 pgs.

"U.S. Appl. No. 14/314,312, Non Final Office Action dated Nov. 27, 2018", 29 pgs.

"U.S. Appl. No. 14/314,312, Notice of Allowability dated Jan. 7, 2020", 3 pgs.

"U.S. Appl. No. 14/314,312, Notice of Allowance dated Oct. 25, 2019", 9 pgs.

"U.S. Appl. No. 14/314,312, Response filed Jan. 28, 2019 to Non Final Office Action dated Nov. 27, 2018", 10 pgs.

"U.S. Appl. No. 14/314,312, Response filed Feb. 28, 2018 to Non Final Office Action dated Aug. 30, 2017", 13 pgs.

"U.S. Appl. No. 14/314,312, Response filed Mar. 17, 2017 to Non Final Office Action dated Oct. 17, 2016", 12 pgs.

"U.S. Appl. No. 14/314,312, Response filed Apr. 5, 2016 to Non Final Office Action dated Nov. 5, 2015", 13 pgs.

"U.S. Appl. No. 14/314,312, Response filed Aug. 14, 2017 to Final Office Action dated Apr. 12, 2017", 16 pgs.

"U.S. Appl. No. 14/314,312, Response filed Sep. 6, 2018 to Final Office Action dated May 10, 2018", 12 pgs.

"U.S. Appl. No. 14/314,312, Response filed Oct. 5, 2016 to Final Office Action dated May 5, 2016", 12 pgs.

"U.S. Appl. No. 14/314,312, Response filed May 3, 2019 to Final Office Action dated Mar. 22, 2019", 11 pgs.

"U.S. Appl. No. 14/314,324, Advisory Action dated Sep. 21, 2017", 4 pgs.

"U.S. Appl. No. 14/314,324, Final Office Action dated May 3, 2017", 33 pgs.

"U.S. Appl. No. 14/314,324, Final Office Action dated May 5, 2016", 24 pgs.

"U.S. Appl. No. 14/314,324, Non Final Office Action dated Oct. 14, 2016", 26 pgs.

"U.S. Appl. No. 14/314,324, Non Final Office Action dated Nov. 5, 2015", 23 pgs.

"U.S. Appl. No. 14/314,324, Notice of Allowance dated Nov. 8, 2017", 7 pgs.

"U.S. Appl. No. 14/314,324, Response filed Feb. 14, 2017 to Non Final Office Action dated Oct. 14, 2016", 19 pgs.

"U.S. Appl. No. 14/314,324, Response filed Apr. 5, 2016 to Non Final Office Action dated Nov. 5, 2015", 15 pgs.

"U.S. Appl. No. 14/314,324, Response filed Sep. 1, 2017 to Final Office Action dated May 3, 2017", 10 pgs.

"U.S. Appl. No. 14/314,324, Response Filed Oct. 5, 2016 to Final Office Action dated May 5, 2016", 14 pgs.

"U.S. Appl. No. 14/314,324, Response filed Nov. 3, 2017 to Advisory Action dated Sep. 21, 2017", 11 pgs.

"U.S. Appl. No. 14/314,334, Appeal Brief filed Apr. 15, 2019", 19 pgs.

"U.S. Appl. No. 14/314,334, Examiner Interview Summary dated Apr. 28, 2017", 3 pgs.

"U.S. Appl. No. 14/314,334, Examiner Interview Summary dated Nov. 26, 2018", 3 pgs.

"U.S. Appl. No. 14/314,334, Final Office Action dated Feb. 15, 2019", 40 pgs.

"U.S. Appl. No. 14/314,334, Final Office Action dated May 16, 2016", 43 pgs.

"U.S. Appl. No. 14/314,334, Final Office Action dated May 31, 2018", 38 pgs.

"U.S. Appl. No. 14/314,334, Final Office Action dated Jul. 12, 2017", 40 pgs.

"U.S. Appl. No. 14/314,334, Non Final Office Action dated Jan. 22, 2018", 35 pgs.

"U.S. Appl. No. 14/314,334, Non Final Office Action dated Oct. 26, 2018", 39 pgs.

"U.S. Appl. No. 14/314,334, Non Final Office Action dated Nov. 13, 2015", 39 pgs.

"U.S. Appl. No. 14/314,334, Non Final Office Action dated Dec. 1, 2016", 45 pgs.

"U.S. Appl. No. 14/314,334, Notice of Allowance dated Jul. 1, 2019", 9 pgs.

"U.S. Appl. No. 14/314,334, Notice of Allowance dated Sep. 19, 2017", 5 pgs.

"U.S. Appl. No. 14/314,334, Response filed Apr. 13, 2016 to Non Final Office Action dated Nov. 13, 2015", 20 pgs.

"U.S. Appl. No. 14/314,334, Response Filed Apr. 23, 2018 to Non Final Office Action dated Jan. 22, 2018", 14 pgs.

"U.S. Appl. No. 14/314,334, Response filed May 20, 2017 to Non Final Office Action dated Dec. 1, 2016", 16 pgs.

"U.S. Appl. No. 14/314,334, Response filed Aug. 30, 2018 to Final Office Action dated May 31, 2018", 13 pgs.

"U.S. Appl. No. 14/314,334, Response filed Sep. 1, 2017 to Final Office Action dated Jul. 12, 2017", 12 pgs.

"U.S. Appl. No. 14/314,334, Response filed Oct. 17, 2016 to Final Office Action dated May 16, 2016", 16 pgs.

"U.S. Appl. No. 14/314,343, Final Office Action dated May 6, 2016", 19 pgs.

"U.S. Appl. No. 14/314,343, Final Office Action dated Aug. 15, 2017", 38 pgs.

"U.S. Appl. No. 14/314,343, Final Office Action dated Sep. 6, 2018", 43 pgs.

"U.S. Appl. No. 14/314,343, Non Final Office Action dated Apr. 19, 2018", 40 pgs.

"U.S. Appl. No. 14/314,343, Non Final Office Action dated Nov. 4, 2015", 14 pgs.

"U.S. Appl. No. 14/314,343, Non Final Office Action dated Nov. 17, 2016", 31 pgs.

"U.S. Appl. No. 14/314,343, Notice of Allowance dated Dec. 17, 2018", 5 pgs.

(56) References Cited

OTHER PUBLICATIONS

"U.S. Appl. No. 14/314,343, Response filed Feb. 15, 2018 to Final Office Action dated Aug. 15, 2017", 11 pgs.
"U.S. Appl. No. 14/314,343, Response filed Apr. 4, 2016 to Non Final Office Action dated Nov. 4, 2015", 10 pgs.
"U.S. Appl. No. 14/314,343, Response filed May 11, 2017 to Non Final Office Action dated Nov. 17, 2016", 13 pgs.
"U.S. Appl. No. 14/314,343, Response filed Jul. 19, 18 to Non Final Office Action dated Apr. 19, 2018", 15 pgs.
"U.S. Appl. No. 14/314,343, Response filed Oct. 6, 2016 to Final Office Action dated May 6, 2016", 13 pgs.
"U.S. Appl. No. 14/314,343, Response Filed Oct. 11, 2018 to Final Office Action dated Sep. 6, 2018", 11 pgs.
"U.S. Appl. No. 14/325,477, Non Final Office Action dated Oct. 9, 2015", 17 pgs.
"U.S. Appl. No. 14/325,477, Notice of Allowance dated Mar. 17, 2016", 5 pgs.
"U.S. Appl. No. 14/325,477, Response filed Feb. 9, 2016 to Non Final Office Action dated Oct. 9, 2015", 13 pgs.
"U.S. Appl. No. 15/208,973, Final Office Action dated May 10, 2018", 13 pgs.
"U.S. Appl. No. 15/208,973, Non Final Office Action dated Sep. 19, 2017", 17 pgs.
"U.S. Appl. No. 15/208,973, Notice of Allowability dated Feb. 21, 2019", 3 pgs.
"U.S. Appl. No. 15/208,973, Notice of Allowance dated Nov. 20, 2018", 14 pgs.
"U.S. Appl. No. 15/208,973, Preliminary Amendment filed Jan. 17, 2017", 9 pgs.
"U.S. Appl. No. 15/208,973, Response filed Sep. 5, 2018 to Final Office Action dated May 10, 2018", 10 pgs.
"U.S. Appl. No. 15/921,282, Notice of Allowance dated Oct. 2, 2019", 9 pgs.
"U.S. Appl. No. 16/277,750, Non Final Office Action dated Aug. 5, 2020", 8 pgs.
"U.S. Appl. No. 16/277,750, Notice of Allowance dated Nov. 30, 2020", 5 pgs.
"U.S. Appl. No. 16/277,750, PTO Response to Rule 312 Communication dated Mar. 30, 2021", 2 pgs.
"U.S. Appl. No. 16/277,750, Response filed Nov. 5, 2020 to Non Final Office Action dated Aug. 5, 2020", 27 pgs.
"U.S. Appl. No. 16/277,750, Supplemental Notice of Allowability dated Dec. 28, 2020", 2 pgs.
"U.S. Appl. No. 16/298,721, Advisory Action dated May 12, 2020", 3 pgs.
"U.S. Appl. No. 16/298,721, Examiner Interview Summary dated Oct. 20, 2020", 3 pgs.
"U.S. Appl. No. 16/298,721, Final Office Action dated Mar. 6, 2020", 54 pgs.
"U.S. Appl. No. 16/298,721, Non Final Office Action dated Jul. 24, 2020", 80 pgs.
"U.S. Appl. No. 16/298,721, Non Final Office Action dated Oct. 3, 2019", 40 pgs.
"U.S. Appl. No. 16/298,721, Notice of Allowance dated Nov. 10, 2020", 5 pgs.
"U.S. Appl. No. 16/298,721, PTO Response to Rule 312 Communication dated Feb. 4, 2021", 2 pgs.
"U.S. Appl. No. 16/298,721, Response filed Jan. 3, 2020 to Non Final Office Action dated Oct. 3, 2019", 10 pgs.
"U.S. Appl. No. 16/298,721, Response filed Apr. 23, 2020 to Final Office Action dated Mar. 6, 2020", 11 pgs.
"U.S. Appl. No. 16/298,721, Response filed Oct. 22, 2020 to Non Final Office Action dated Jul. 24, 2020", 13 pgs.
"U.S. Appl. No. 16/548,279, Advisory Action dated Jul. 23, 2021", 3 pgs.
"U.S. Appl. No. 16/548,279, Final Office Action dated May 21, 2021", 24 pgs.
"U.S. Appl. No. 16/548,279, Non Final Office Action dated Mar. 1, 2021", 26 pgs.
"U.S. Appl. No. 16/548,279, Non Final Office Action dated Aug. 4, 2021", 23 pgs.
"U.S. Appl. No. 16/548,279, Response filed May 5, 2021 to Non Final Office Action dated Mar. 1, 2021", 11 pgs.
"U.S. Appl. No. 16/548,279, Response filed Jul. 16, 2021 to Final Office Action dated May 21, 2021", 10 pgs.
"U.S. Appl. No. 16/732,858, Non Final Office Action dated Jul. 19, 2021", 29 pgs.
"U.S. Appl. No. 16/732,858, Response filed Oct. 19, 2021 to Non Final Office Action dated Jul. 19, 2021", 12 pgs.
"U.S. Appl. No. 16/749,708, Non Final Office Action dated Jul. 30, 2021", 29 pgs.
"Bilinear interpolation", Wikipedia, [Online] Retrieved from the Internet: <URL: https://web.archive.org/web/20110921104425/http://en.wikipedia.org/wiki/Bilinear_interpolation>, (Jan. 8, 2014), 3 pgs.
"imatest", [Online] Retrieved from the Internet on Jul. 10, 2015: <URL: https://web.archive.org/web/20150710000557/http://www.imatest.com/>, 3 pgs.
"KR 10-0853122 B1 machine translation", IP.com, (2008), 29 pgs.
Ahlberg, Jorgen, "Candide-3: An Updated Parameterised Face", Image Coding Group, Dept, of Electrical Engineering, Linkoping University, SE, (Jan. 2001), 16 pgs.
Baxes, Gregory A., et al., "Digital Image Processing: Principles and Applications, Chapter 4", New York: Wiley, (1994), 88-91.
Chen, et al., "Manipulating, Deforming and Animating Sampled Object Representations", Computer Graphics Forum vol. 26, (2007), 824-852 pgs.
Dornaika, F, et al., "On Appearance Based Face and Facial Action Tracking", IEEE Trans. Circuits Syst. Video Technol. 16(9), (Sep. 2006), 1107-1124.
Milborrow, S, et al., "Locating facial features with an extended active shape model", European Conference on Computer Vision, Springer, Berlin, Heidelberg, [Online] Retrieved from the Internet: <URL: http://www.milbo.org/stasm-files/locating-facial-features-with-an-extended-asm.pdf>, (2008), 11 pgs.
Neoh, Hong Shan, et al., "Adaptive Edge Detection for Real-Time Video Processing using FPGAs", Global Signal Processing, vol. 7. No. 3, (2004), 7 pgs.
Ohya, Jun, et al., "Virtual Metamorphosis", IEEE MultiMedia, 6(2), (1999), 29-39.
Tchoulack, Stephane, et al., "A Video Stream Processor for Real-time Detection and Correction of Specular Reflections in Endoscopic Images", 2008 Joint 6th International IEEE Northeast Workshop on Circuits and Systems and TAISA Conference, (2008), 49-52.
U.S. Appl. No. 14/314,324 U.S. Pat. No. 9,928,874, filed Jun. 25, 2014, Method for Real-Time Video Processing Involving Changing Features of an Object in the Video.
U.S. Appl. No. 15/921,282 U.S. Pat. No. 10,566,026, filed Mar. 14, 2018, Method for Real-Time Video Processing Involving Changing Features of an Object in the Video.
U.S. Appl. No. 16/732,858, filed Jan. 2, 2020, Method for Real-Time Video Processing Involving Changing Features of an Object in the Video.
"U.S. Appl. No. 16/732,858, Final Office Action dated Nov. 4, 2021", 19 pgs.
Florenza, Lidia, "Real Time Corner Detection for Miniaturized Electro-Optical Sensors Onboard Small Unmanned Aerial Systems", Sensors, 12(1), (2012), 863-877.
Kaufmann, Peter, "Finite Element Image Warping", Computer Graphics Forum, vol. 32, No. 2-1, Oxford, UK BlackwellPublishing Ltd., (2013), 31-39.
Phadke, Gargi, "Illumination Invariant Mean-Shift Tracking", 2013 IEEE Workshop on Applications of Computer Vision (WACV), doi: 10 1109 WACV.2013.6475047, (2013), 407-412.
Salmi, Jussi, "Hierarchical grid transformation for image warping in the analysis of two-dimensional electrophoresis gels", Proteomics, 2(11), (2002), 1504-1515.

* cited by examiner

900

- 905: Receive a video including a sequence of images
- 910: Receive/generate a request to blur the background of the video
- 915: Identify at least one object of interest in one or more of the images
- 920: Detect feature reference points (e.g., facial landmarks) of the at least one object of interest
- 925: Align a virtual face mesh to the at least one object of interest in at least some of the images based at least in part on the feature reference points
- 930: Identify a background on each of the images
- 935: Modify the background on each of the images (e.g., by blurring)
- 940: Compress the background
- 945: Generate a modified video which includes the at least one object of interest and the modified background
- 950: Transmit the modified video over a communications network

*FIG. 9*

BACKGROUND MODIFICATION IN VIDEO CONFERENCING

This application is a Continuation of U.S. application Ser. No. 14/987,514, filed Jan. 4, 2016, which is a continuation of U.S. application Ser. No. 14/661,367, filed Mar. 18, 2015, each of which are hereby incorporated by reference in their entirety.

TECHNICAL FIELD

This disclosure relates generally to video conferencing and, more particularly, to systems and methods for modifying a scene background in a video stream based on identifying and tracking participants in the video.

DESCRIPTION OF RELATED ART

Today, video conferencing and videophone calls are popular tools for conducting two-way video and audio communications over long distances. This technology has been developing rapidly due to the emergence of high speed networking solutions, inexpensive hardware components, and deployment of cellular networks. Typically, video conferencing allows two or more individuals to communicate with each other using a variety of software applications, such as video chat applications, where the participants can view each other while talking. Video chats can be available on general-purpose computers, mobile devices, and television systems as downloadable software applications or web services. Traditional hardware requirements for video conferencing include, on each side, an input audio module (e.g., a microphone), input video module (e.g., a video camera), output audio module (e.g., speakers), output video module (e.g., a display or projector), and a computing device that ties together input and output modules, compresses and decompresses audio and video streams, and initiates and maintains the data linkage via a communications network.

Although video conferencing solutions have existed for many years, there can be issues with video streaming, especially in the case of congested networks. When quality of service (QoS) in a particular network significantly drops down, the video conference can experience difficulties with delivering video in a timely fashion, which may cause unwanted interruptions or significant degradation of audio and video quality. Accordingly, there is still a need in the art to improve video conferencing technology.

SUMMARY

In general, this disclosure relates to the technology for video conferencing, which tracks faces of individuals and transmits a video stream having the image portions associated with the faces in a higher quality than the remaining video image. In various embodiments, the technology allows modifying a scene background (for example, by blurring) and keeping a foreground associated with the faces in an original quality. Ultimately, this leads to the reduction of network requirements needed for video conferencing because the modified video has a lower data rate. Depending on network congestion conditions, this technology allows improving video conferencing solutions, reducing the number of interruptions in video streaming, and preventing degradations of video streaming.

According to one aspect of the technology, a computer-implemented method for real-time video processing is provided. The method may comprise receiving a video including a sequence of images, identifying at least one object of interest in one or more of the images, detecting feature reference points of the at least one object of interest, and tracking the at least one object of interest in the video. The tracking may comprise creating a virtual face mesh (also referred herein to as "mesh" for simplicity) and/or aligning the mesh to the at least one object of interest in one or more of the images based on the feature reference points. Further, the method proceeds to identifying a background in one or more of the images by separating the at least one object of interest from each image based on the mesh, modifying the background in each of the images to generate a modified background, and generating a modified video which includes the at least one object of interest and the modified background.

In some embodiments, the modified background has a first image quality in the modified video and the at least one object of interest has a second image quality in the modified video, where the first image quality is lower than the second image quality.

In certain embodiments, the step of identifying the background may include selecting an image portion which excludes pixels associated with the mesh. The modification of the background may include one or more of the following: blurring, changing one or more background colors, changing a background resolution, changing a video dot density, changing posterizaion, and changing pixelization of the background. In some embodiments, the modification of the background may include replacement of the background or its portion with a predetermined image.

In some embodiments, the at least one object of interest includes at least a portion of an individual other than a human face. In other embodiments, the at least one object of interest includes a human face.

In certain embodiments, the feature reference points can include facial landmarks. In certain embodiments, the feature reference points are at least one of points indicating the following: eyebrows' vertical position, eyes' vertical position, eyes' width, eyes' height, eyes' separation distance, nose's vertical position, nose pointing up, mouth's vertical position, mouth's width, chin's width, upper lip raiser, jaw drop, lip stretcher, left brow lowerer, right brow lowerer, lip corner depressor, and outer brow raiser.

According to yet additional embodiments, the method may further include the step of compressing the background. The method may further include the step of transmitting the modified video over a communications network. In yet other embodiments, the method may further include the step of receiving a request to blur the background of the video.

In some embodiments, the method may further comprise monitoring QoS associated with a communications network and, based on the monitoring, generating a request to blur the background of the video. In other embodiments, the method may further comprise dynamically monitoring a network parameter associated with transferring of the video over a communications network, and generating a request to blur the background of the video if the network parameter is below a predetermined threshold value, or, if the network parameter is above the predetermined threshold value, generating a request to transmit the video without blurring. The network parameter may include a bit rate or a network bandwidth.

In certain embodiments, the modifying of the background includes gradual blurring of the background, where a degree of the gradual blurring depends on the network parameter. In certain embodiments, the step of identifying the at least one objects of interest may include applying a Viola-Jones algorithm to the images. The step of detecting the feature reference points may include applying an Active Shape Model (ASM) algorithm to areas of the images associated with the at least one object of interest.

In certain embodiments, the method may comprise the steps of: dynamically determining a value related to QoS associated with a communications network; based on the determining, if the value associated with the QoS is within a first predetermined range, generating a first request to blur only the background of the video; if the value associated with the QoS is within a second predetermined range, generating a second request to blur the background of the video and other parts of the video excluding a user face; and if the value associated with the QoS is within a third predetermined range, not generating a request to blur the background. Here, the first range differs from the second range and the third range, and the second range differs from the third range and the first range.

In yet more embodiments, the step of identifying the background may comprise: forming a binary mask associated with the at least one object of interest, aligning the binary mask to the mesh on each image, and creating an inverted binary mask by inverting the binary mask. The forming of the binary mask may comprise: determining a gray value intensity of a plurality of image sections in each of the images, where the plurality of image sections are associated with the mesh; determining object pixels associated with the object of interest by comparing the gray value intensity of each of the image sections with a reference value; applying a binary morphological closing algorithm to the object pixels; and removing unwanted pixel conglomerates from the mesh. The aligning of the binary mask to the mesh may comprise making a projection of the mesh to a reference grid, thereby separating the mesh into a plurality of reference grid cells; associating mesh elements which correspond to reference grid cells; and determining pixels of each of the images which correspond to the mesh elements.

In some embodiments, the method may further comprise modifying image portions associated with the at least one object of interest in one or more of the images. The modifying of the image portions associated with the at least one object of interest can be based on the feature reference points. The modifying of the image portions associated with the at least one object of interest may include changing at least one of a color, a color tone, a proportion, and a resolution.

In some embodiments, the method may comprise the steps of determining a position of a head based on the identifying of the at least one object of interest and the reference feature points; determining a position of a body based on the position of the head; and tracking the position of the body over the sequence of images. The background blurring or modification can be based on the position of the body. For example, if tracking of body is not feasible based on the images, but tracking of user face is feasible based on the images, background blurring can be based on approximation of body position.

According to another aspect of the technology, a system is provided. An example system comprises a computing device including at least one processor and a memory storing processor-executable codes, which, when implemented by the least one processor, cause to perform the method steps described above.

According to another aspect of the technology, a non-transitory processor-readable medium having instructions stored thereon, which when executed by one or more processors, cause the one or more processors to implement the method steps described above.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which:

FIG. 9 is a process flow diagram showing a first exemplary method for real-time video processing.

DETAILED DESCRIPTION

Figure 1A:
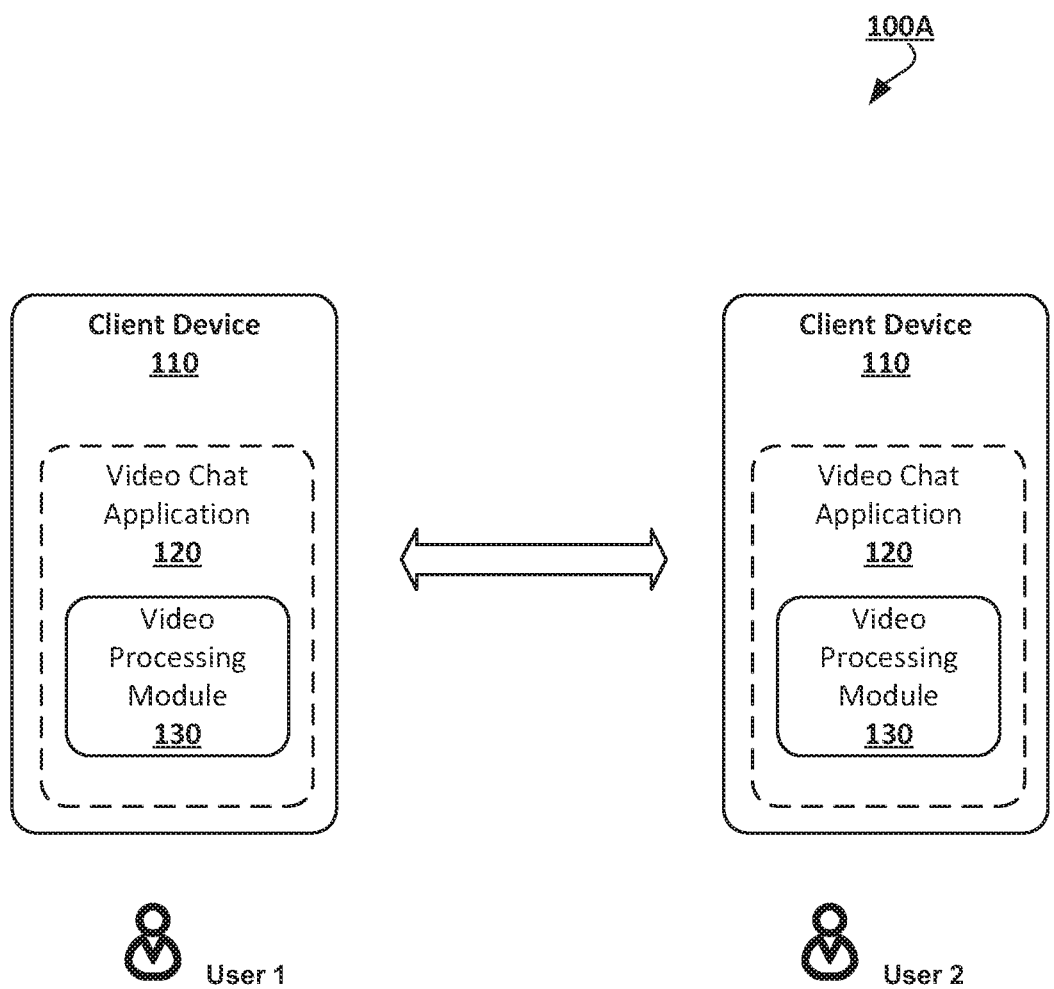
FIG. 1A shows a high-level block diagram of a first example system environment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a server, network device, general-purpose computer (e.g., a desktop computer, tablet computer, laptop computer), game console, handheld gaming device, cellular phone, smart phone, television system, in-vehicle computing device, and so forth.

1. INTRODUCTION

The present technology provides for methods and systems for video conferencing, which allow for identifying and tracking faces of individuals presented in captured video images, and modifying the video such that the portions of the video images other than the faces have lower quality. This can be accomplished by blurring a scene background, although other processes can be also used such as decreasing background resolution or compressing the background.

The term "video conferencing," as used herein, refers to a telecommunication technology, which allows two or more people to communicate by simultaneous two-way video and audio transmissions. The video transmissions include communicating a plurality of video images also known as video frames. In this disclosure, the term "video conferencing" covers other similar terms including "videophone calling," "videotelephony," "video teleconferencing," and "video chatting," among others.

The present technology ultimately helps to improve video conferencing experience in congested network environments, especially when network QoS is reduced temporary or permanently. The technology also allows for reducing the number of interruptions in video conferencing, as well as preserving privacy by obscuring a scene background.

As discussed below in details, the core element of this technology is locating and tracking a background in video images, and further modifying the background by changing it either graphically (e.g., by blurring), or by changing its quality by reducing its resolution, video dot density, color banding, or by selectively compressing, changing posterizaion, changing pixelization, smoothing, and so forth. In some embodiments, the background can be completely replaced with a predetermined image which can be stored in a local memory or selected by a video conference participant. During a teleconference, the scene background typically changes from one video frame to another due to the movements of the individual. Therefore, accurate identifying of the background for each video frame is one of the crucial elements in this technology.

According to various embodiments of this disclosure, scene backgrounds can be identified for each video frame through: (a) identifying individuals in video images and (b) considering the entire image area other than the identified individuals. The individuals can be identified and tracked using a variety of video processing algorithms. For example, individual faces can be identified using the combination of a Viola-Jones algorithm, which is targeted to locate a face in video images, and an ASM algorithm, which is designed to detect feature reference points associated with the face. Once faces are located, a mesh based on the feature reference points can be created and aligned to the individuals in the video images. Further, selecting the entire video image area, excepting the mesh, constitutes a scene background. Further, the background can be modified in any intended way, such as by blurring, smoothing, changing resolution, and reducing video dot density (i.e., dots per inch (DPI)), so that the image quality of the scene background is reduced compared to the faces, which ultimately leads to data rate decrease. A background can be also replaced with a predetermined image. In some embodiments, the located foreground or faces of individuals can be also graphically modified. For example, the foreground or faces of individuals can be smoothed or sharpened, their colors can be changed, or any other modifications can be made.

This video processing, as described herein, can be implemented to a video stream in real time or it can be applied to a previously stored video file (including progressive download solutions). Moreover, in some embodiments, the video processing is applied to each video image individually, while in other embodiments, the video processing can be applied to a video as a whole. It should be also noted that the video processing steps can be implemented on either a client side or a server side, or both, depending on a particular system architecture.

According to various embodiments of this disclosure, the background modification can be initiated in response to a user request, or in response to detection of a predetermined event. For example, this technology may dynamically monitor one or more network parameters, such as a QoS, bit rate, or network bandwidth. When one of these parameters drops below a predetermined threshold value, the background modification can be initiated in order to reduce data rate associated with the video streaming.

In some embodiments, the degree of background modification can depend on current network parameters. For example, the worse the network's condition, the lower the quality of the background, and vice versa. In other words, the degree of background blurring, smoothing, resolution, and compression may depend on the current network parameters. Notably, in this scenario, when the network conditions improve, the degree of background modification can be lowered or the background could be kept totally unmodified. In additional embodiments, the degree of foreground modification (when needed) can also depend on current network parameters.

In yet more embodiments of this disclosure, the modification of a background can include multiple steps. For example, in addition to background blurring, a background resolution can be changed. Alternatively, after a background is blurred, it can be also compressed. In other examples, after the blurring, a background can also be pixelated or its color can be changed, among other processes. It should be appreciated that any combination of background modification procedures can include two, three, or more separate processes.

It should be also noted that the present technology can also modify portions of the video images that relate to the identified individuals. For example, color parameters, shape, or proportions of the individual faces can be modified in any desired way. In yet another example, individual faces can be replaced with predetermined images or masks. In yet other examples, portions of video images related to individual faces can be smoothed.

2. COMPUTING ENVIRONMENT

In general, video conferencing can be implemented using one or more software applications running on a client side, server side, or both. In some embodiments, the video conferencing can be implemented as a web service or as a "cloud" solution, meaning it is available to conference participants via a website or web interface.

FIG. 1A shows a high-level block diagram of a first "peer-to-peer" example system environment 100A suitable for practicing the present technology. As shown in this figure, there are at least two client devices 110, each belonging to separate individuals in different locations. Client devices 110 refer to, but are not limited, a user device, terminal, computing device (e.g., laptop computer, tablet computer, desktop computer), cellular phone, smart phone, personal digital assistant (PDA), gaming console, remote control, multimedia system, television system, set-top box, infotainment system, in-vehicle computing device, informational kiosk, and so forth.

Each of client devices 110 has a video chat application 120. The video chat applications 120 are generally configured to enable video conferencing between a first and second user, and provide video processing, as described herein. For these ends, each video chat application 120 includes a video processing module 130, which is configured to modify a background scene in each of the video images in order to reduce a data rate of the video. The modification can include blurring, compressing, changing resolution, pixilation, video dot density, color banding, posterizaion, or pixelization, and so forth. The degree of modification can optionally depend on current network parameters. Video chat applications 120 can be implemented as software, middleware, or firmware, can be separate applications, or can constitute a part of larger software applications.

As shown in the figure, client devices 110 are connected into a peer-to-peer (P2P) network allowing their direct video teleconferencing with each other. Data between nodes can be exchanged directly using, for example, TCP/IP (Transmission Control Protocol/Internet Protocol) network communication standards. In some embodiments, the P2P network can include more than two client devices 110.

Figure 1B:
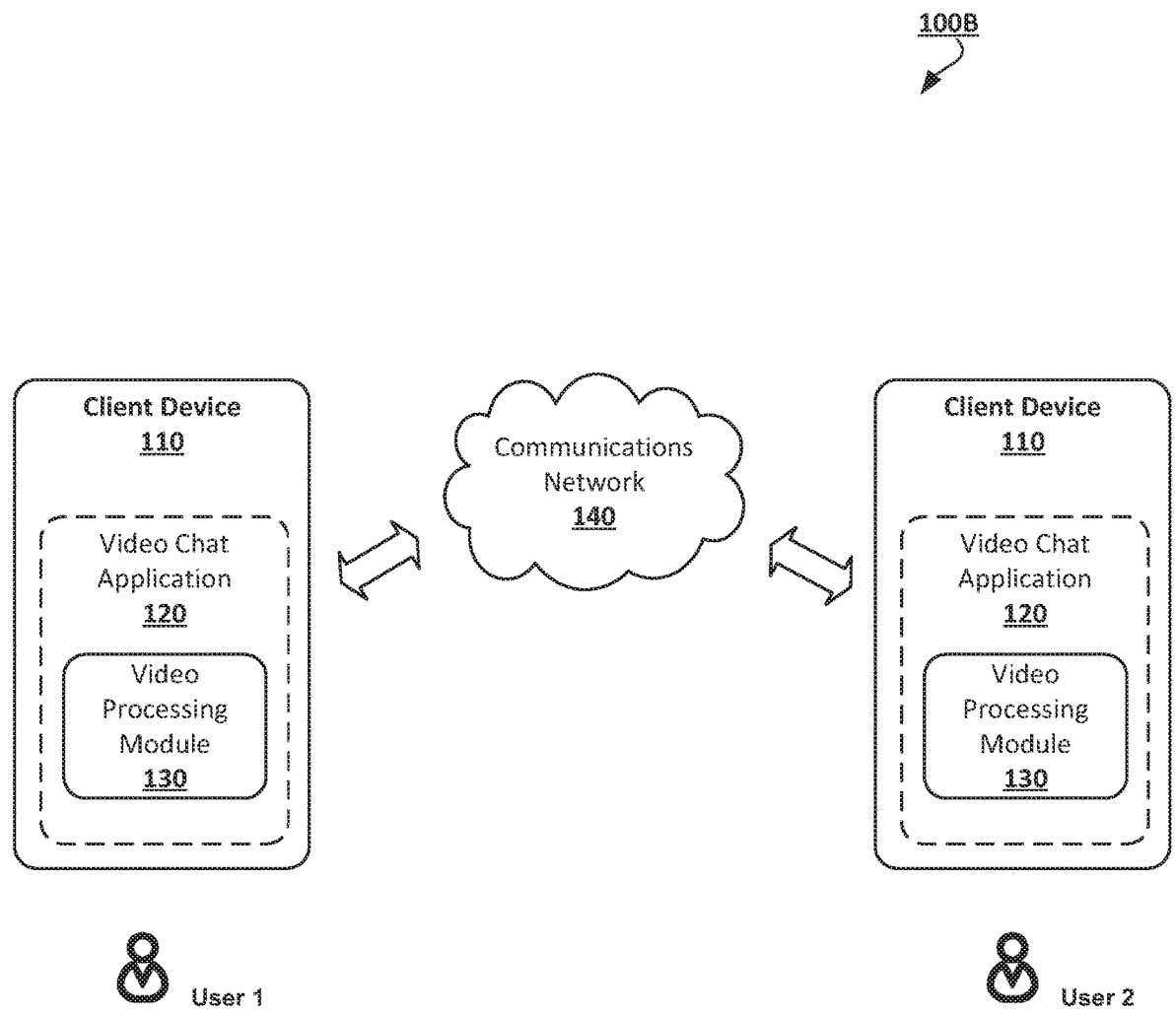
FIG. 1B shows a high-level block diagram of a second example system environment.

FIG. 1B shows a high-level block diagram of a second example system environment 100B suitable for practicing the present technology. As shown in this figure, the communication between client devices 110 is performed via a communications network 140. In various embodiments, communications network 140 may include one or more of the Internet, intranet, cellular network, local area network, wide area network, Institute of Electrical and Electronics Engineers (IEEE) 802.11 based network, Bluetooth radio, and so forth. Similar to above, video teleconferencing between client devices 110 can be implemented using, for example, TCP/IP network communication standards.

Figure 2:
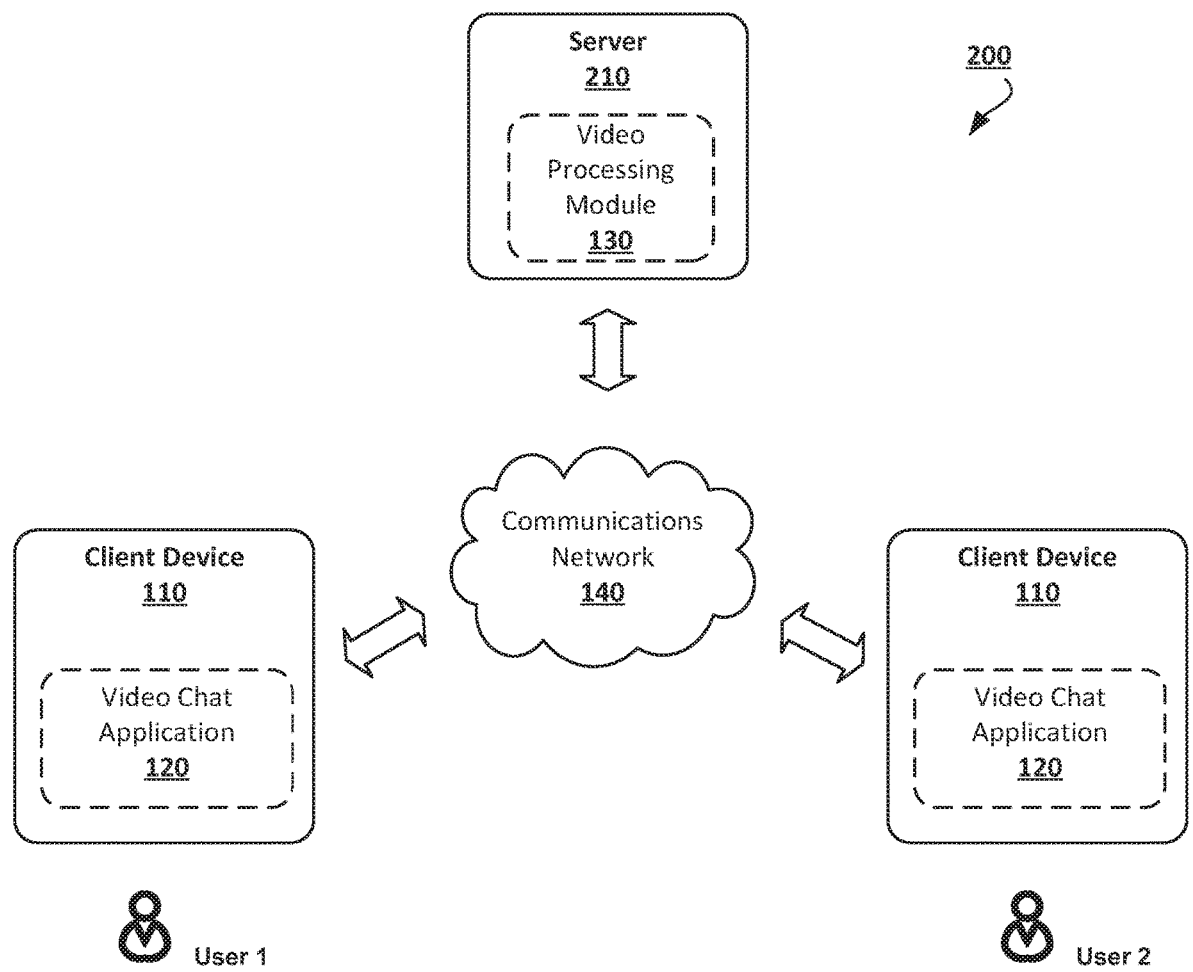
FIG. 2 shows a high-level block diagram of a third example system environment.

FIG. 2 shows a high-level block diagram of a third example system environment 200 suitable for practicing the present technology. In this embodiment, there is provided server 210 that includes video processing module 130, while video chat applications 120 on client devices 110 lack it. Accordingly, background modification and other video processing methods as described herein are implemented on the server 210. The communication between video chat applications 120 and video processing module 130 can include the use of application programming interface (API) codes.

In some embodiments, the video streaming between the client devices 110 can occur via server 210 such that the client devices 110 are responsible for audio and video capture, audio and video delivery, and data transfer. In other embodiments, server 210 provides background modification only, while client devices 110 implement the remaining communication tasks.

Figure 3:
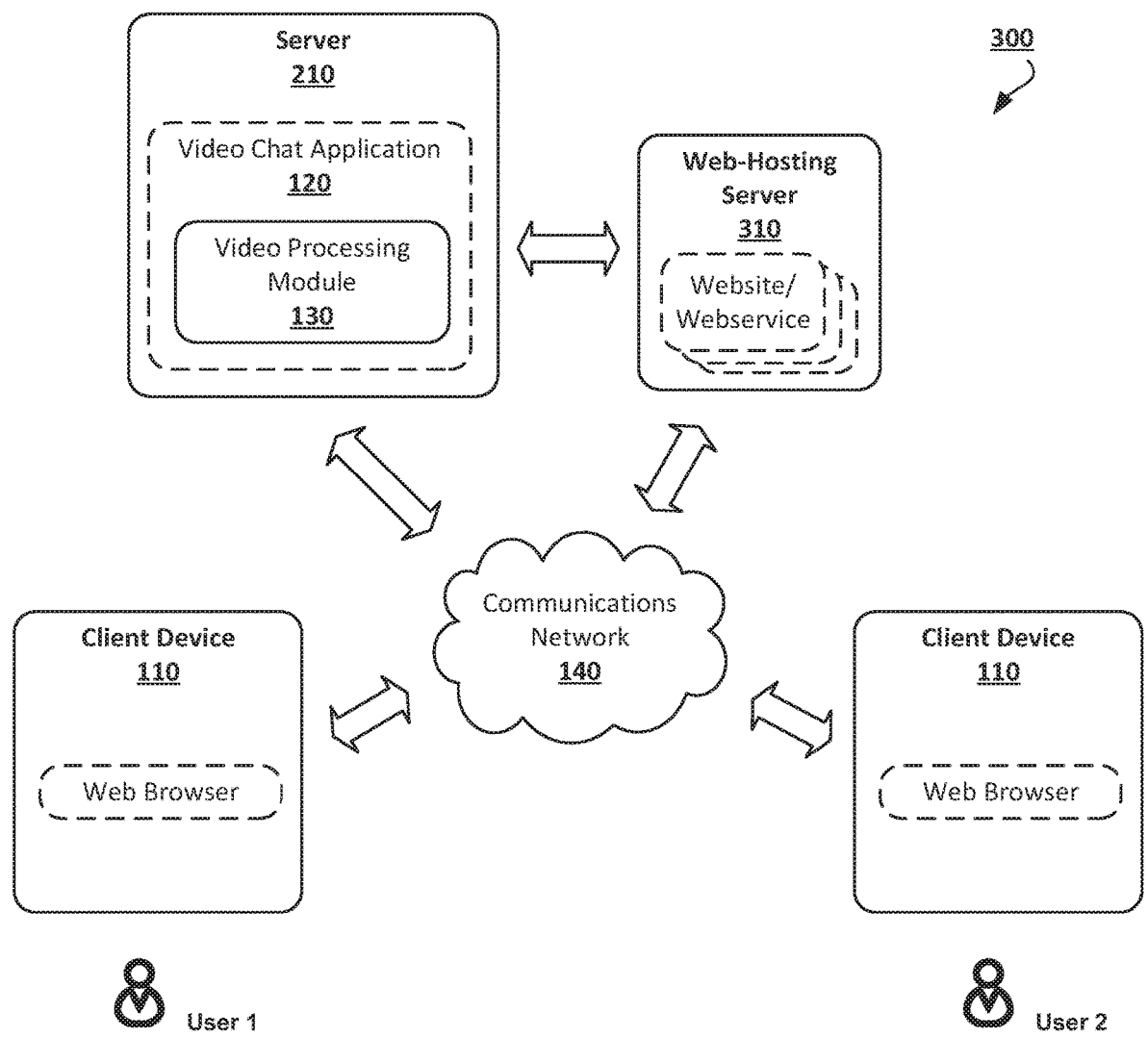
FIG. 3 shows a high-level block diagram of a fourth example system environment.

FIG. 3 shows a high-level block diagram of a fourth example system environment 300 suitable for practicing the present technology. In this example, client devices 110 include web browsers only, thereby allowing the users to visit a predetermined website hosted by web-hosting server 310. Video chat application 120, in this embodiment, is located at server 210 and implemented as a web service associated with the website hosted by web-hosting server 310. Therefore, the video processing and background modification, as described herein, are performed completely on the server side.

3. SYSTEM ARCHITECTURE AND PROCESS OVERVIEW

Figure 4:
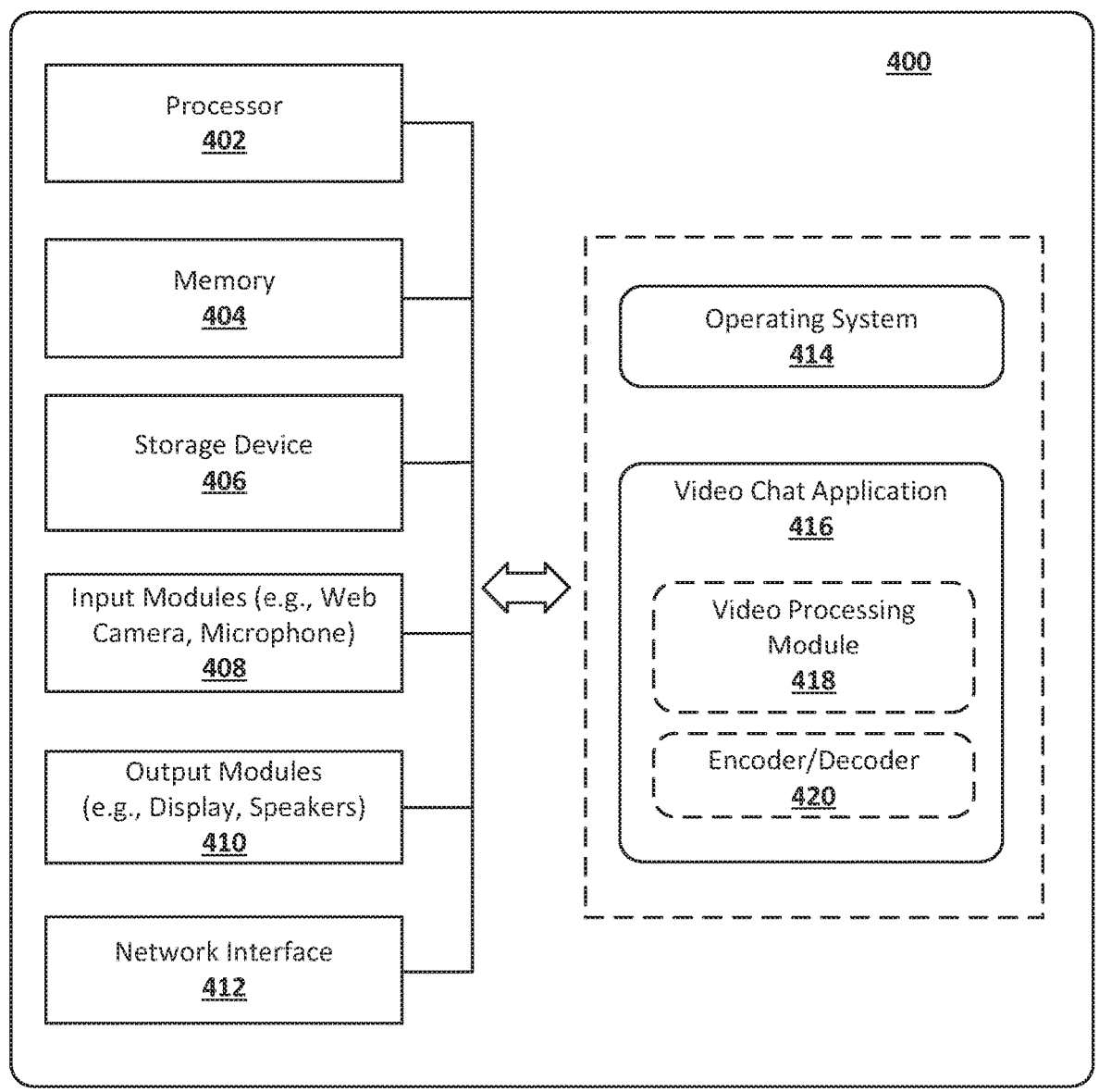
FIG. 4 is a high-level block diagram illustrating an example system suitable for implementing methods for video processing described herein.

FIG. 4 is a high-level block diagram illustrating an example system 400 suitable for implementing the methods for video processing described herein. In particular, system 400 refers to exemplary client device 110. Note that all components of system 400 may include logic elements, hardware components, software (firmware) components, virtual components, or a combination thereof. System 400 may include, relate, or constitute an integral part of one or more of a variety of types of devices and systems such as a general-purpose computer, network device, server, web service, Apache server, cloud-computing service, and so forth. Further, all modules shown in FIG. 4 may be operatively coupled using any suitable wired, wireless, radio, electrical, or optical standards.

As shown in this figure, system 400 includes the following hardware components: at least one processor 402, memory 404, at least one storage device 406, at least one input module 408, at least one output module 410, and network interface 412. System 400 also includes optional operating system 414 and video chat application 416.

In various embodiments, processor 402 is configured to implement functionality and/or process instructions for execution within the system 400. For example, processor 402 may process instructions stored in memory 404 and/or instructions stored on storage devices 406. Such instructions may include components of operating system 410 and video chat application 416. System 400 may include multiple processors 402 such as a central processing unit (CPU) and graphic processing unit (GPU), which can share operational tasks with each other.

Memory 404 is configured to store information within system 400 during operation. Memory 404, in some example embodiments, refers to a non-transitory computer-readable storage medium or a computer-readable storage device. In some examples, memory 404 is a temporary memory, meaning that a primary purpose of memory 404 may not be long-term storage. Memory 404 may also refer to a volatile memory, meaning that memory 404 does not maintain stored contents when memory 404 is not receiving power. Examples of volatile memories include random access memories (RAM), dynamic random access memories (DRAM), static random access memories (SRAM), and other forms of volatile memories known in the art. In some examples, memory 404 is used to store program instructions for execution by the processor 402. Memory 404 may also be used to temporarily store information during program execution.

Storage device 406 can include one or more transitory or non-transitory computer-readable storage media and/or computer-readable storage devices. In some embodiments, storage device 406 may be configured to store greater amounts of information than memory 404. Storage device 406 may further be configured for long-term storage of information. In some examples, storage device 406 includes non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

Still referencing to FIG. 4, system 400 includes one or more input modules 408 for receiving user inputs and one or more output modules 410 for delivering data to a user. Input modules 408 may include a keyboard, trackball, touchscreen, microphone, video camera or web camera, and the like. Output modules 410 may include any appropriate device to deliver data through visual or audio channels, including displays, monitors, printers, touchscreens, speakers, and so forth.

System 400 further includes network interface 412, which is configured to communicate with external devices, servers, and network systems via one or more communications networks 140. Network interface 412 may be a network interface card, such as an Ethernet card, optical transceiver, radio frequency transceiver, or any other type of device that can send and receive information. Other examples of such network interfaces may include Bluetooth®, 3G (Third Generation), 4G (Fourth Generation), LTE (Lon-Term Evolution), and WiFi® radios. In some embodiments, network interface 412 can also be configured to measure various network parameters such as QoS, bit rate, network bandwidth, among others.

Operating system 414 may control one or more functionalities of system 400 or components thereof. For example, operating system 414 may interact with video chat application 416, and may further facilitate interactions between video chat application 416 and processor 402, memory 404, storage device 406, input modules 408, output modules 410, and/or network interface 412. Video chat application 416 is configured to provide video conferencing services by implementing two-way audio and video communications with another client device. Video chat application 416 is also configured to implement video processing methods, such as background blurring, as described herein.

Accordingly, FIG. 4 shows a typical system for video conferencing which may operate as follows. For example, video images are input into video chat application 416 from a camera (input module 408) and then to video processing module 418 for blurring scene background. Further, the video images having a blurred background (i.e., modified video) can be encoded by encoder/decoder 420 and transmitted to other video conference participants via network interface 412. The receiving participants, using similar systems 400, receive the modified video through network interface 412, decode it with encoder/decoder 420 to recover and display the video with the background blurred on their displays (output module 410).

4. FACE DETECTION

As provided above, the present video processing methods enable modification of a video image background, such as background blurring processing. However, backgrounds shall be identified before they are graphically modified. For these ends, the present technology focuses on identification of individuals, and more specifically, on individual faces presented in video images. Once individual faces are identified, the video background can easily be determined based on selection of image regions that exclude the image portion associated with identified individual faces. Therefore, the process for facial identification is one of the most important steps in the present technology.

Figure 5:
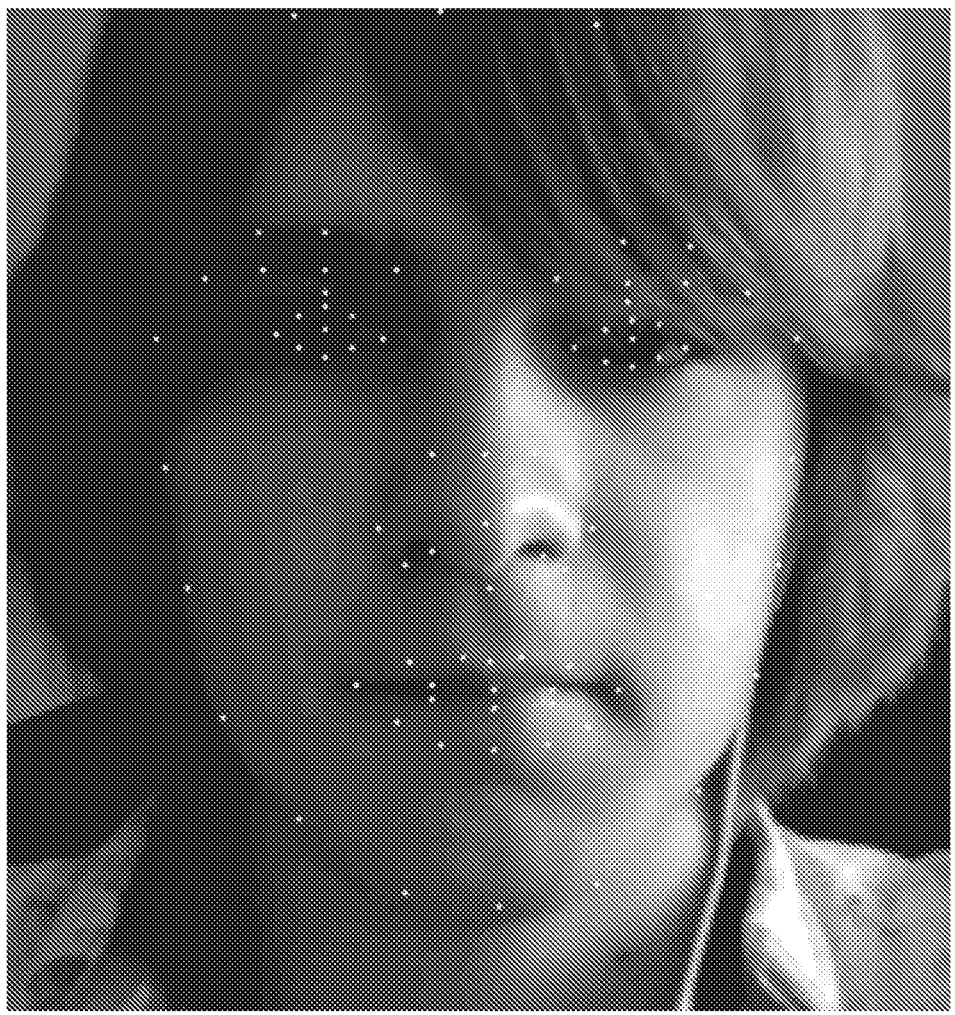
FIG. 5 shows an example image of a face with multiple landmarks (reference feature points).

According to various embodiments of this disclosure, a face in an image can be identified by application of a Viola-Jones algorithm and ASM algorithm. In particular, a Viola-Jones algorithm is a fast and quite accurate method for detecting a face region on an image. An ASM algorithm is then applied to the face region to locate reference feature points associated with the face. These feature reference points can include one or more facial landmarks such as ala, philtrum, vermilion zonem, vermilion border, nasolabial sulcus, labial commissures, lip tubercle, nasion, outer canthos of eye, inner canthos of eye, and tragus of ear. Moreover, the feature reference points can include one or more of the following facial points indicating: eyebrows' vertical position, eyes' vertical position, eyes' width, eyes' height, eye separation distance, nose's vertical position, nose's pointing up, mouth's vertical position, mouth's width, chin's width, upper lip raiser, jaw drop, lip stretcher, left brow lowerer, right brow lowerer, lip corner depressor, and outer brow raiser. FIG. 5 shows an example image of a face where multiple reference feature points are illustrated.

In some embodiments, locating reference feature points includes locating one or more predetermined facial landmarks. For example, a predetermined facial landmark may refer to a left eye pupil. A set of landmarks can define a facial shape as a set of vectors.

Further, an ASM algorithm starts searching for landmarks on a mean facial shape, which is aligned to the position and size of the face presented in the input image. An ASM algorithm then repeats the following two steps until convergence: (i) suggest a tentative shape by adjusting the locations of shape points by template matching of image texture around each point, (ii) conform the tentative shape to a global shape model. The shape model pools the results of weak template matchers to form a stronger overall classifier. The entire search is repeated at each level in an image pyramid, from coarse to fine resolution. Thus, two sub-model types make up the ASM, namely a profile model and a shape model.

The profile models (one for each landmark at each pyramid level) are used to locate an approximate position of each feature reference point by template matching. Any template matcher can be used, but the classical ASM forms a fixed-length normalized gradient vector (also known as a profile) by sampling the image along a line (also known as a whisker) orthogonal to the shape boundary at a landmark. While training on manually landmarked faces, at each landmark (feature reference point) the mean profile vector $\bar{g}$ and the profile covariance matrix $S_g$ are calculated. While searching, the landmark (feature reference point) along the whisker is displaced to the pixel whose profile g has lowest Mahalanobis distance from the mean profile $\bar{g}$, where $$\text{MahalanobisDistance} = (g-\bar{g})^T S_g^{-1}(g-\bar{g}). \qquad (1)$$

Further, the shape model specifies allowable constellations of landmarks. A shape of individual can be given by its shape vector $x=(x_i^T)^T$, where $x_i$ is i-th facial landmark. The shape model generates the shape $\hat{x}$ with $$\hat{x} = \bar{x} + \Phi b \qquad (2)$$

where $\bar{x}$ is the mean shape, b is a parameter vector, and $\Phi$ is a matrix of selected eigenvectors of profile covariance matrix $S_g$ of the points of the aligned training shapes. Using a standard principal components approach, the model has as many variations as is desired by ordering the eigenvalues λi and keeping an appropriate number of corresponding eigenvectors in Φ. In this process, a single shape model for the entire ASM is used but it may be scaled for each pyramid level Further, Equation 2 is used to generate various shapes by varying the vector parameter b. By keeping the elements of b within limits (determined during model building), it is possible to ensure that generated face shapes are lifelike.

Conversely, given a suggested shape x, the method can calculate the parameter b that allows Equation 2 to better approximate x with a model shape $\hat{x}$. The method can further use an iterative algorithm to minimize $$\text{distance}(x, T(\bar{x} + \Phi b)) \quad (3)$$

where T is a similarity transform that maps the model space into the image space.

In one or more embodiments, CANDIDE-3 shape and initial state can be estimated based on a mapping of CANDIDE-3 vertices to weighted combinations of reference feature points located by ASM. CANDIDE-3 is a parameterized three-dimensional face mesh specifically developed for model-based coding of human faces. It includes a small number of polygons (approximately 100) and allows fast reconstruction. CANDIDE-3 is controlled by Shape Units (SUs), Action Units (AUs), and a position vector. The SUs control mesh shape so as different face shapes can be obtained. The AUs control facial mimics so as different expressions can be obtained. The position vector corresponds to rotations around three (orthogonal) axes and translations along the axes.

Assuming that the observed face is frontal viewed in the image, only yaw estimation is needed among the three rotation parameters. It can be found as an angle from the positive direction of the x-axis to a vector joining the right eye center feature point with the left one. The following equation system can be created, assuming that the observed face is neutral and frontal viewed in the image, and the mesh points are projected on the image plane by scaled orthographic projection:

$$R\left\{\begin{pmatrix} x_i \\ y_i \end{pmatrix} + \begin{pmatrix} \sum_{j=1}^{m} X_{ij} * b_j \\ \sum_{j=1}^{m} Y_{ij} * b_j \end{pmatrix}\right\} + \begin{pmatrix} x \\ y \end{pmatrix} = z \begin{pmatrix} \hat{x}_i \\ \hat{y}_i \end{pmatrix} \quad (4)$$

where $$R = \begin{pmatrix} \cos\theta & -\sin\theta \\ \sin\theta & \cos\theta \end{pmatrix}$$

is a rotation matrix, corresponding to the found yaw θ, $b_j$ is j-th SU intensity; x, y, z are mesh translational coordinates; $x_i$ and $y_i$ are i-th mesh vertex model coordinates; $\hat{x}_i$ and $\hat{y}_i$ are i-th mesh vertex image coordinates obtained as weighted combinations of reference feature points; and Xij, Yij are coefficients, which denote how the i-th mesh vertex model are changed by j-th SU. Based on the foregoing, the following minimization can be made:

$$\left(x_i\cos\theta - y_i\sin\theta + \sum_{j=1}^{m}(X_{ij}\cos\theta - Y_{ij}\sin\theta)*b_j + x - z\hat{x}_i\right)^2 + \quad (5)$$

$$\left(x_i\sin\theta + y_i\cos\theta + \sum_{j=1}^{m}(X_{ij}\sin\theta + Y_{ij}\cos\theta)*b_j + y - z\hat{y}_i\right)^2 \to \min_{b_j,x,y,z}.$$

The solution of this linear equation system is $$b = (X^T X)^{-1} X^T x \quad (6)$$

where $X = (((X_{ij}\cos\theta - Y_{ij}\sin\theta), 1, 0, -\hat{x}_i)^T, ((X_{ij}\sin\theta + Y_{ij}\cos\theta), 0, 1, -\hat{y}_i)^T)^T,$ $x = -((x_i\cos\theta - y_i\sin\theta)^T, (x_i\sin\theta + y_i\cos\theta)^T)^T,$ $$b = ((b_j)^T, x, y, z)^T. \quad (7)$$

In some embodiments, a Viola-Jones algorithm and ASM algorithm can be used to improve tracking quality. Face tracking processes can lose face position under some circumstances, such as fast movements and/or illumination variations. In order to re-initialize tracking algorithm, in this technology, ASM algorithm is applied in such cases.

5. FACE TRACKING

According to various embodiments of this disclosure, tracking of identified faces is an important step after faces are identified in the video images. Because individuals can move in each of the video images, the background also changes with the movement of the individuals. Face tracking allows tracking background modifications for each video image (frame) to enable its modification later.

Figure 6:
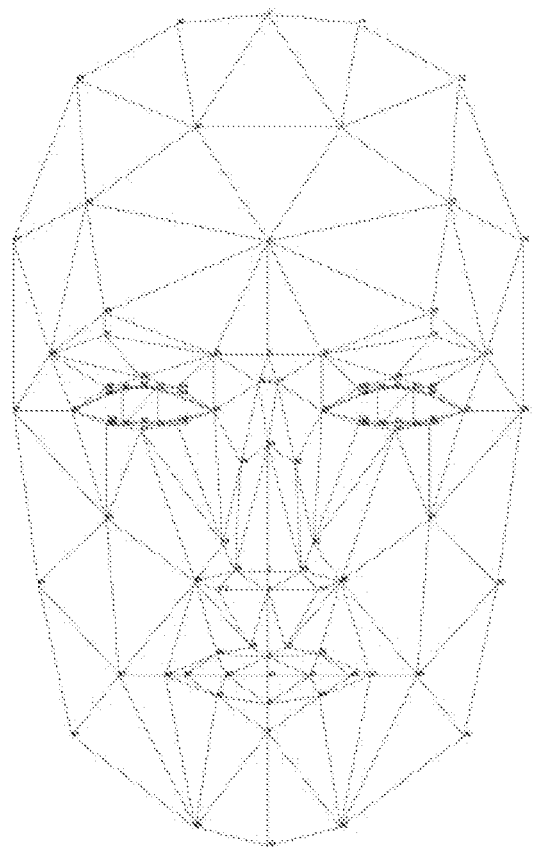
FIG. 6 shows an exemplary mesh corresponding to a CANDIDE-3 model.

CANDIDE-3 model can be used for face tracking. See Jörgen Ahlberg, *Candide-3—an updated parameterized face*, Technical report, Linköping University, Sweden, 2001. FIG. 6 shows an exemplary mesh corresponding to CANDIDE-3 model created with respect to the face shown in FIG. 5.

In one or more embodiments, a state of CANDIDE-3 model can be described by intensity vector of SUs, intensity vector of AUs and a position vector. SUs refer to various parameters of head and face. For example, the following SUs can be used: vertical position of eyebrows, vertical position of eyes, eyes' width, eyes' height, eye separation distance, nose vertical position, nose pointing up, mouth vertical position, mouth width, and chin width. AUs refer to face parameters that correspond to various face mimics. For example, the following AUs can be used: upper lip raiser, jaw drop, lip stretcher, left brow lowerer, right brow lowerer, lip corner depressor, and outer brow raiser.

Figure 7A:
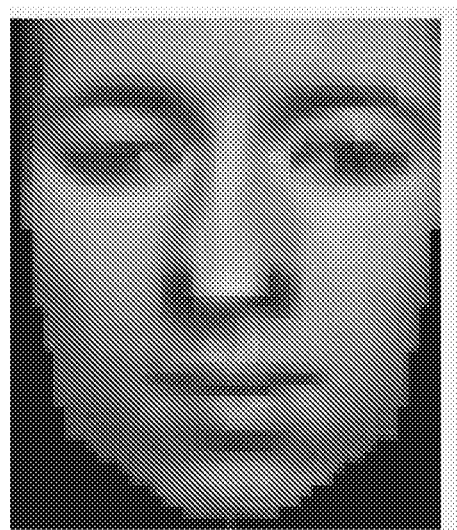
FIG. 7A shows an example mean face.
Figure 7B:
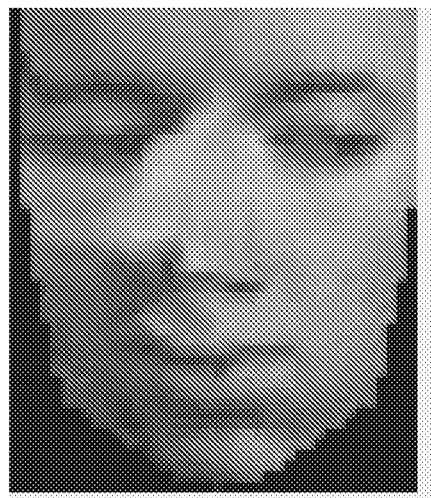
FIG. 7B shows an example observation under a current state of a mesh illustrated in FIG. 8.
Figure 8:
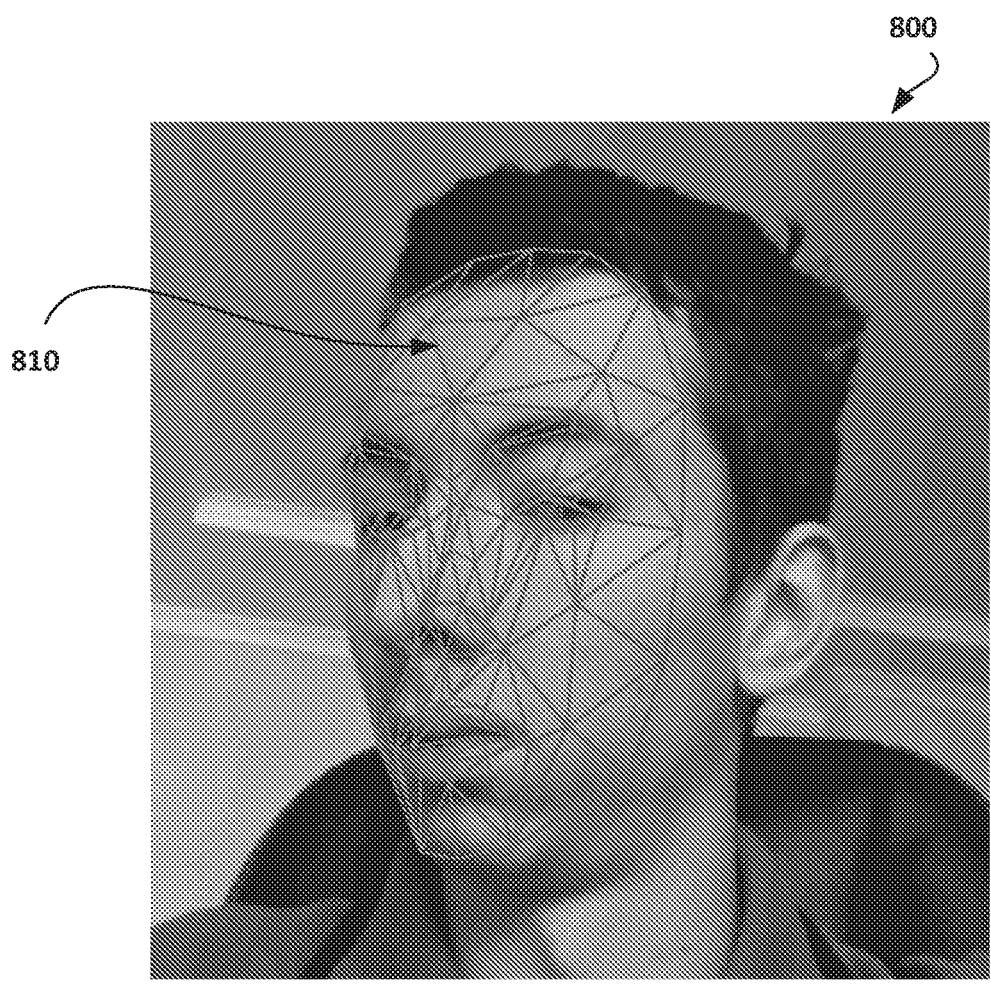
FIG. 8 shows an exemplary image having a face and a mesh aligned to the face.

The state of mesh, such as one shown in FIG. 6, can be described using six coordinates: yaw, pitch, roll, x, y, and z (scale). Following Dornaika et al. approach, a mesh state can be determined by observing the region most likely to be a face. See Dornaika F. & Davoine F., *On appearance based face and facial action tracking*. IEEE Trans. Circuits Syst. Video Technol. 16(9):1107-1124 (2006)). For each mesh position, observation errors can be calculated. Observation errors refer to a value indicating the difference between an image under a current mesh state and a mean face. FIG. 7A shows an example mean face. FIG. 7B shows an example warped towards standard CANDIDE-3 state observation under a current state of the mesh illustrated in FIG. 8. More specifically, FIG. 8 shows an exemplary image 800 having a face and a mesh 810 aligned to the face.

In one or more embodiments, a face modelled as a picture with a fixed size (e.g., width=40 px, height=46 px) is referred to as a mean face. In one or more embodiments, the observation process can be implemented as a warping process from the current CANDIDE-3 state towards its standard state, and denoted by $$x(b)=W(y,b), \quad (8)$$

where x denotes the observed image with the same size as of mean face, y denotes the input image, and b denotes the CANDIDE-3 AUs intensities and state parameters. Gaussian distribution proposed in original algorithms has shown worse results compared to a static image. Thus, the difference between the current observation and mean face can be calculated as follows:

$$e(b)=\Sigma(\log(1+I_m)-\log(1+I_i))^2 \quad (9)$$

Logarithm function can make the tracking more stable and reliable. In one or more embodiments, a Taylor series can be used to minimize error. The gradient matrix is given by $$G = \frac{\partial W(y,b)}{\partial b} = \frac{\partial x}{\partial b} \quad (10)$$

Derivatives can be calculated as follows:

$$g_{ij} = \frac{W(y, b+\delta_j q_j)_i - W(y, b-\delta_j q_j)_i}{2\delta_j} \quad (11)$$

where $q_j$ is a vector with all elements zero except the j-th element that equals one.

Here, $g_{ij}$ is an element of matrix G. This matrix has size m*n, where m is larger than n (e.g., m is about 1600 and n is about 14). In case of straight-forward calculating, there n*m operations of division have to be completed. To reduce the number of divisions, this matrix can be rewritten as a product of two matrices: G=A*B. Here, matrix A has the same size as G. Each element of matrix A can be represented as:

$$a_{ij}=W(y,b+\delta_j q_j)_i - W(y,b-\delta_j q_j)_i \quad (12)$$

Matrix B is a diagonal matrix with sizes n*n, and its elements can represented as follows:

$$b_{ii}=(2\delta_i)^{-1}.$$

Matrix $G^+$ can be calculated as follows, which ultimately reduce a number of divisions:

$$G^+=(G^T G)^{-1} G^T=(B^T A^T AB)^{-1} B^T A^T = B^{-1}(A^T A)^{-1} B^{-T} B^T A^T = B^{-1}(A^T A)^{-1} A^T \quad (13)$$

This transformation allows making $n^3$ divisions instead of $m*n+n^3$.

Yet another optimization can be used in this method. If matrix $G^+$ is created and then multiplied by $\Delta b$, it leads to $n^2 m$ operations, but if the first $A^T$ and $\Delta b$ are multiplied and then multiplied by $B^{-1}(A^T A)^{-1}$, there will be only $n*m+n^3$ operations, which is much better because n≪m.

Thus, face tracking in the video comprises CANDIDE-3 shape and initial state estimating that is based on located reference feature points associated with a particular face and aligning the mesh to the face in each video image. Notably, this process can be applied not only to a face, but also to other individual parts. In other words, this process of localization and tracking of a video conferencing participant may include localization and tracking one or more of the participant's face, his body, limbs, and/or other parts. In some embodiments, gesture detection and tracking processes can be also applied. In this case, the method may create a virtual skeleton and a mesh aligned to these body parts.

It should be also noted that ARM advanced SIMD (Single Instruction Multiple Data) extensions (also known as "NEON" provided by ARM Limited) can be used for multiplication of matrices in order to increase tracking performance. Also, a GPU (Graphics Processing Unit) can be used in addition to or instead of CPU (Central Processing Unit), whenever possible. To get high performance of GPU, operations can be arranged in a particular ways.

According to some embodiments of the disclosure, the face tracking process can include the following features. First, a logarithm can be applied to grayscale the value of each pixel to track it. This transformation has a great impact to tracking performance. Second, in the procedure of gradient matrix creation, the step of each parameter can be based on the mesh scale.

In order to automatically re-initialize tracking algorithm in failure cases, the following failure criterion can be used:

$$\|W(y_t,b_t)-W(y_{t-1},b_{t-1})\|_2 > M \quad (14)$$

where $\|\cdot\|_2$ is Euclidean norm, $y_t$, $b_t$ are indexed by an image number t.

6. BACKGROUND IDENTIFICATION AND MODIFICATION

As outlined above, once faces or other parts of video conference participants are detected (identified), the present technology identifies a background in each video image. There can be used various procedures for background identification including selection of the entire image area and excluding those portions that relate to identified faces based on created meshes. Another procedure can include forming a binary mask aligned to a face and then inverting the binary mask so as to select image areas not associated with the face. Identification of background in each video image allows modifying the background in any intended way. For example, modification can include blurring, although other modification procedures can be also applied such as changing background resolution, video dot density, color banding, or compressing, encoding, changing posterizaion, changing pixelization, and so forth. Background modification can depend on user instructions or current network conditions. These and other embodiments for background identification and modification are described below with reference to exemplary flow charts.

FIG. 9 is a process flow diagram showing a first exemplary method 900 for real-time video processing. The method may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of client device 110 or server 210. Note that below recited steps of method 900 may be implemented in an order different than described and shown in FIG. 9. Moreover, method 900 may have additional steps not shown herein, but which can be evident for those skilled in the art from the present disclosure. Method 900 may also have fewer steps than outlined below and shown in FIG. 9.

Method 900 for video processing commences at operation 905 with establishing a videoconference between at least two users and receiving a video by a computing device such as the client device 110 or server 210. The video can be captured by a video or web camera operatively coupled to the computing device. As a general matter, the video includes a sequence of video images (also known as video frames) and the video can be received as a video stream (meaning it can be continually supplied to the computing device (e.g., as progressive downloading)) or it can be stored in a memory of the computing device. The video can be captured for video conferencing purposes, but not necessarily.

At optional operation 910, the computing device receives a request to blur (or modify in other way) a background in the video so as to change a data rate or file size. In one example, the request can be generated manually by a user such as one of video conference participants. In another example, the request can be generated automatically in response to changing networking conditions. For example, the computing device may dynamically monitor QoS or other parameters associated with one or more communications networks 140, and based on the results of monitoring, a request to start background blurring or a request to stop background blurring can be generated. In one example, when it is determined that the network condition becomes worse (meaning that a data transmission rate, bandwidth or bit rate is reduced), a number of errors is increased, or another parameter is changed, the request for background blurring is generated in order to decrease the size of the video file or decrease data rate, and prevent video interruptions or degradations.

At operation 915, the computing device identifies or detects at least one object of interest in one or more video images. As discussed above, the object of interest may refer to a face of a user or body parts of the user, including limbs, neck, arms, chest, and so forth. The identification can be based on a Viola-Jones algorithm, although other algorithms can be also used such as Kanade-Lucas-Tomasi (KLT) algorithm, CAMShift algorithm, or any other computer vision method.

In some other embodiments, the identification of the at least one object of interest in one or more of the images can be based on a user input. For example, the user input can include data associated with an image area related to the at least one object of interest.

At operation 920, the computing device detects feature reference points of at least one object of interest (e.g., a face). Feature reference points can include various facial landmarks such as, but not limited to, as ala, philtrum, vermilion zonem vermilion border, nasolabial sulcus, labial commissures, lip tubercle, nasion, outer canthos of eye, inner canthos of eye, tragus of ear, eyebrows vertical position, eyes vertical position, eyes' width, eyes' height, eye separation distance, nose vertical position, nose pointing up, mouth vertical position, mouth width, chin width, upper lip raiser, jaw drop, lip stretcher, left brow lowerer, right brow lowerer, lip corner depressor, and outer brow raiser. The feature reference points can be determined using ASM or extended ASM algorithms as explained above. However, other procedures of facial landmark localization can also be used including, but not limited to, exemplar-based graph matching (EGM) algorithm, consensus-of-exemplars algorithm, and so forth.

At operation 925, the computing device optionally creates a virtual facial mesh (referred to as the "mesh" for simplicity) or uses a predetermined mesh, and aligns the mesh to the least one object of interest (e.g., a face) based at least in part on the feature reference points. This procedure is performed for some of the images or each of the video images separately, which ultimately allows dynamically tracking faces in the video. As discussed above, CANDIDE-3 model can be applied for creating and aligning the mesh. CANDIDE-3 is a procedure for generating a parameterized face mesh (mask) based on calculation of global and local AUs.

At operation 930, the computing device identifies or detects a background in each video image. In general, a background can be identified using a variety of processes. In one example embodiment, a background is identified by separating the at least one object of interest from each image based on the mesh. In another example embodiment, a background is identified by selecting a portion of a video image, which is located outside of the mesh. In other words, the background is identified by selecting an image portion (for each video image) which excludes pixels associated with the mesh.

In yet another example embodiment, a background is identified by the process including: (a) forming a binary mask associated with the at least one object of interest, (b) aligning the binary mask to the mesh on each image, and (c) creating an inverted binary mask by inverting the binary mask.

The binary mask can be formed as follows. First, the computing device determines a gray value intensity (or a mean gray value intensity) of a plurality of image sections in each of the images, where the plurality of image sections are associated with the mesh. Second, the computing device determines object pixels associated with the object of interest by comparing the gray value intensity of each of the image sections with a reference value. Third, the computing device applies a binary morphological closing algorithm to the object pixels. Forth, the computing device removes unwanted pixel conglomerates from the mesh.

The binary mask can be aligned to the mesh, for example, as follows. First, the computing device makes a projection of the mesh to a reference grid. thereby separating the mesh into a plurality of reference grid cells. Second, the computing device associates elements of the mesh, which correspond to reference grid cells. Third, the computing device determines pixels of each of the images which correspond to the elements of the mesh. This determination can be made by applying a breadth-first search (BFS) algorithm.

Still referencing to FIG. 9, at operation 935, the computing device modifies the identified background in each video image. The modification can include blurring such as Gaussian smoothing or a lens blurring algorithm. However, other modifications can also be used such as changing background resolution, changing video dot density, changing colors, changing color banding, compressing, encoding, changing posterizaion, and changing pixelization. In some embodiments, background can be replaced with a predetermined image (for privacy of video conference participants). The degree of modification can depend on current network parameters. For example, the smaller the network bit rate, the higher degree of blurring or other modification method is applied to the identified background, and vice versa.

As discussed above, the background modification is targeted to decrease image quality associated with a background, while preserving high image quality of the participants. In other words, the modified background has a first image quality in the modified video and the at least one object of interest has a second image quality in the modified video, and the first image quality is lower than the second image quality. Difference between the first image quality and second image quality may depend on current network conditions or network parameters, which can be measured by the computing device.

At optional operation 940, the computing device may compress or encode the background or modified background. Compression may include applying one or more codecs to the background. For example, codec H264 can be used for compression of the background. Notably, in some embodiments, two codecs can be used, where one codec is applied to the background, while another one to identified objects of interest (e.g., faces).

At operation 945, the computing device generates a modified video by combining the modified background with the image of the object of interest. At optional operation 950, the computing device may transmit the modified video over communications network 140.

In yet additional embodiments, method 900 may further comprise optional operations of modifying those image portions that are associated with the at least one object of interest in each of the images. The modifying of the image portions associated with the at least one object of interest can be based on the feature reference points or the mesh. For example, the modifying of the image portions associated with the at least one object of interest includes changing at least one of a color, a color tone, a proportion, and a resolution. In some embodiments, the at least one object of interest can be replaced with a predetermined image.

In yet more embodiments, method 900 may comprise an additional step of determining a position of the user head based on the identifying of the at least one object of interest and the reference feature points, an additional step of determining a position of a body based on the position of the head, and an additional step of tracking the position of the body over the sequence of images. The background modification at operation 935 can be based on the position of the body. For example, if tracking the body is not feasible based on the images, but tracking of the user face is feasible based on the images, background modification can be based on approximation of body position such that the user face and body remain unmodified, but the remaining portions of video images are modified.

Figure 10:
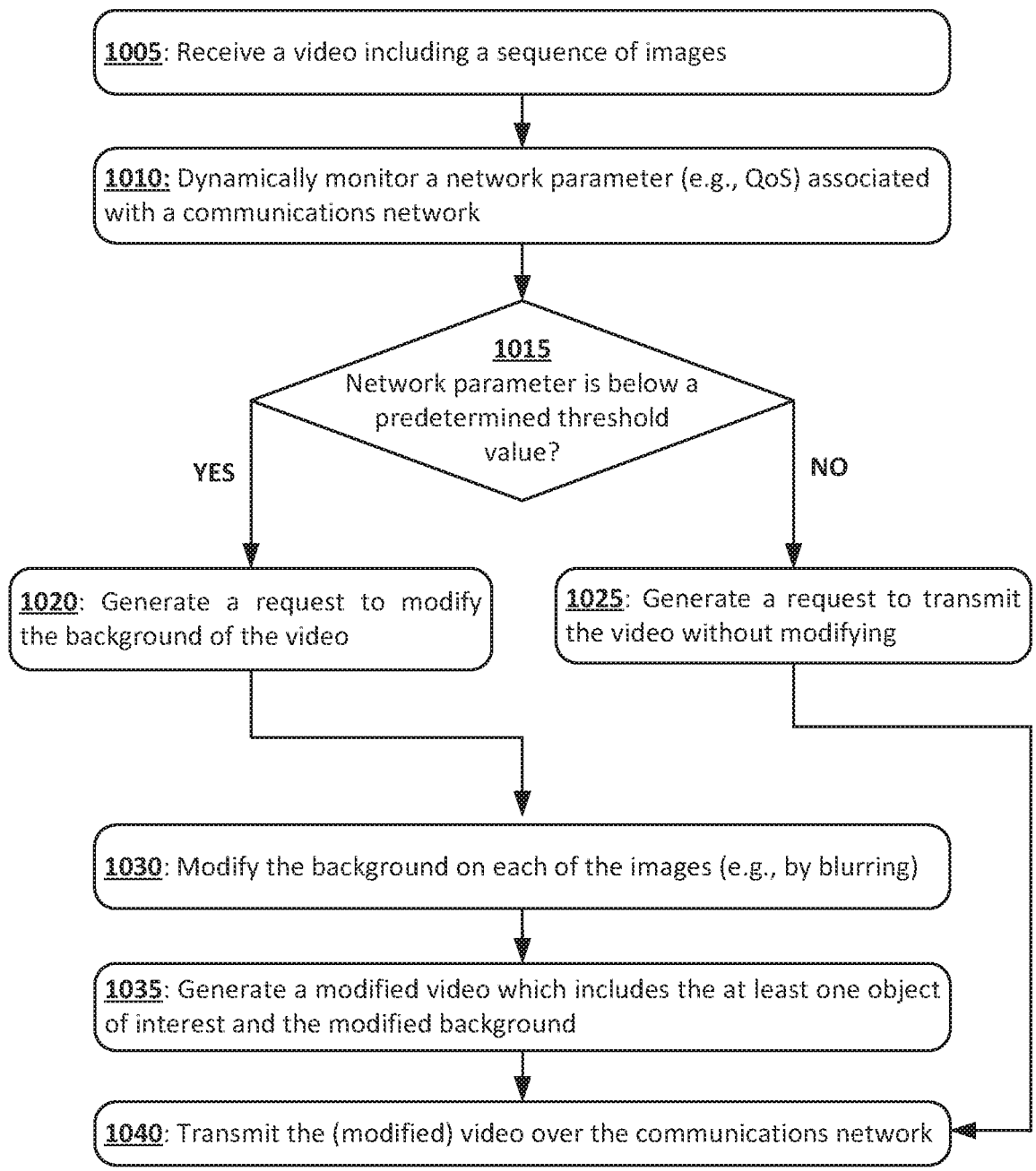
FIG. 10 is a process flow diagram showing a second exemplary method 900 for real-time video processing.

FIG. 10 is a process flow diagram showing a second exemplary method 1000 for real-time video processing. The method may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of client device 110 or server 210. Note that below recited steps of method 1000 may be implemented in an order different than described and shown in FIG. 10. Moreover, method 1000 may have additional steps not shown herein, but which can be evident for those skilled in the art from the present disclosure. Method 1000 may also have fewer steps than outlined below and shown in FIG. 10.

Method 1000 commences at operation 1005 with receiving a video by a computing device such as the client device 110 or server 210. The video can be captured by a video or web camera operatively coupled to the computing device.

At operation 1010, the computing device dynamically monitors a network parameter (e.g., QoS, bit rate, bandwidth) associated with transferring the video over one or more communications networks 140. At block 1015, the computing device determines whether a current value of the network parameter is below a predetermined threshold value. If the current value of the network parameter is below the predetermined threshold value, method 1000 proceeds to operation 1020 where the computing device generates a request to modify a background in the video. The method then proceeds to operation 1030 as shown in FIG. 10.

Otherwise, if the current value of the network parameter is above the predetermined threshold value, method 1000 proceeds to operation 1025 where the computing device generates a request (instruction) to transmit the video without modifications. In this case, the method proceeds to operation 1040 as shown in FIG. 10.

At operation 1030, the computing device identifies at least one object of interest, detects feature reference points of the at least one object of interest, c aligns a mesh to the least one object of interest, identifies a background in one or more of video images based on the mesh, and modifies the background in each video image. These procedures can replicate those that are described above with reference to operations 915 through 935.

More specifically, the identification of the object of interest can be based on a Viola-Jones algorithm, although other algorithms can be also used such as a KLT algorithm, CAMShift algorithm, or any other computer vision method. In some other embodiments, the identification of the at least one object of interest in each of the images can be based on a user input. The feature reference points can be determined using ASM or extended ASM algorithms, as well as EGM algorithms, consensus-of-exemplars algorithms, and so forth. The mesh can be created based on CANDIDE-3 model. The background can be identified using a variety of processes such as by separating the at least one object of interest from each image based on the mesh, by selecting an image portion which excludes pixels associated with the mesh, or by the process including: (a) forming a binary mask associated with the at least one object of interest, (b) aligning the binary mask to the mesh on each image, and (c) creating an inverted binary mask by inverting the binary mask.

The background modification can include blurring, changing background resolution, changing video dot density, changing colors, changing color banding, compressing, encoding, changing posterizaion, and changing pixelization. The degree of modification can depend on current network parameters. In some embodiments, background modification can include replacement, substituting or covering of the background with a predetermined image or video. The predetermined image can be selected by a user or a default image can be used which is stored in a memory of computing device.

In some embodiments, the foreground can be also modified in addition to modification of the background. In some embodiments, the foreground can be smoothed, sharpened, or its colors can be changed. The foreground may include images of individuals and possibly other elements not present in the background. In yet more embodiments, only identified faces (or objects of interest) can be modified by smoothing, sharpening, changing colors, and so forth.

At operation 1035, the computing device generates a modified video by combining the modified background with the image of the object of interest. At optional operation 1040, the computing device transmits the original or modified video over communications network 140.

Figure 11A:
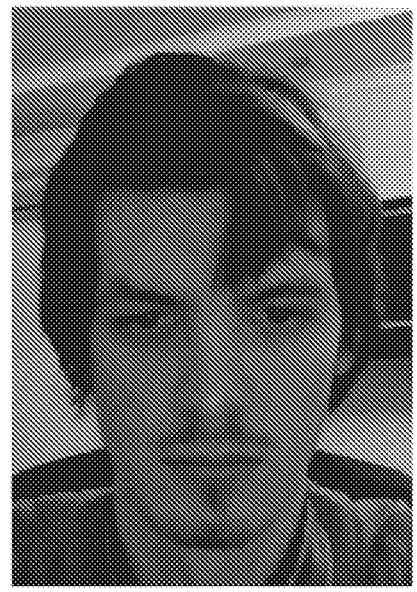
FIG. 11A shows an original video image which includes a face of video conference participant according to one example embodiment.
Figure 11B:
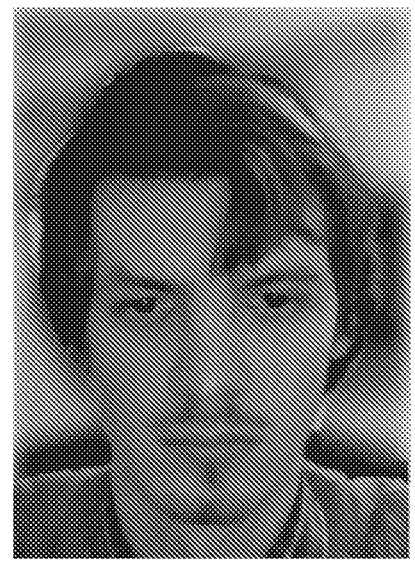
FIG. 11B shows a video image which was modified using the methods for video processing as described herein according to one example embodiment.

FIGS. 11A and 11B show an example result of background modification. More specifically, FIG. 11A shows an original video image which includes a face of a video conference participant. FIG. 11B shows a video image which was modified using one of the methods for video processing as described herein. In the example shown in FIG. 11B, the background was identified and blurred to reduce file size and data transfer rate.

Experiments show that the methods for video processing described herein allow reducing video data rate or video file size up to about 53 percent if everything but the individual faces is blurred, and up to about 21 percent if everything other than the foreground is blurred.

In yet additional embodiments, operations 1015-1025 can be replaced with other ones. More specifically, the present technology can modify the background based on a particular value of a network parameter. For example, if, at operation 1015, it is determined that the network parameter associated with the QoS is within a first predetermined range, then, at operation 1020, a first request is generated to blur only the background of the video (keeping the face and body unmodified). When, at operation 1015, it is determined that the network parameter associated with the QoS is within a second predetermined range, then, at operation 1020, a second request is generated to blur the background of the video and other parts of the video excluding a user face. Further, when, at operation 1015, it is determined that the network parameter associated with the QoS is within a third predetermined range, then, at operation 1025, either no request to blur is generated or a third request is generated to transmit the video without modifying. Note that the first, second, and third ranges differ from each other, although can optionally overlap.

7. CONCLUSION

Thus, methods and systems for real-time video processing have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for performing video processing, the method comprising:
    identifying a foreground object in one or more images in a video, the foreground object comprising a feature reference point;
    identifying a background in each of the one or more images in the video by forming a binary mask aligned to the foreground object, inverting the binary mask to select an area not associated with the foreground object, and separating the foreground object from each of the one or more images in the video based on a shape unit, a position vector, and an intensity vector of the shape unit associated with the foreground object, the position vector corresponding to a rotation and translation around three axes orthogonal to the foreground object and the shape unit corresponding to a vertical position of the feature reference point identified in the foreground object;
    determining a gray value intensity of a plurality of pixels associated with the foreground object;
    comparing the gray value intensity of each of the plurality of pixels with the feature reference point;
    based on the comparison, determining object pixels associated with the foreground object and applying a binary morphological closing function to the object pixels;
    tracking the foreground object comprising the object pixels in the video based on the shape unit, the position vector, and the intensity vector; and
    modifying the background in the video and the foreground object in the video separately based on the tracking of the foreground object to generate a modified video in which the foreground object and the modified background are at different image qualities.

2. The method of claim 1, wherein the modified background has a first image quality in the modified video and the foreground object has a second image quality in the modified video; and wherein the first image quality is lower than the second image quality.

3. The method of claim 1, further comprising identifying the background in the video by separating the foreground object from each image of the video based on the shape unit, the position vector, and the intensity vector, wherein the identifying of the background includes selecting an image portion which excludes pixels associated with a virtual face mesh.

4. The method of claim 1, wherein the modifying of the background includes blurring of the background.

5. The method of claim 1, wherein the modifying of the background includes changing one or more background colors.

6. The method of claim 1, wherein the modifying of the background includes changing a background resolution.

7. The method of claim 1, wherein the modifying of the background includes changing a video dot density.

8. The method of claim 1, wherein the modifying of the background includes changing posterization or pixelization of the background.

9. The method of claim 1, wherein the modifying of the background includes replacing the background with a predetermined image.

10. The method of claim 1, wherein the foreground object includes at least a portion of an individual other than a human face.

11. The method of claim 1, wherein the foreground object includes a human face.

12. The method of claim 1, further comprising transmitting the modified video over a communications network.

13. The method of claim 1, further comprising receiving a request to blur the background of the video.

14. The method of claim 1, further comprising:
    monitoring quality of service associated with a communications network; and
    based on the monitoring, generating a request to blur the background of the video.

15. The method of claim 1, further comprising:
    dynamically monitoring a network parameter associated with transferring of the video over a communications network;
    if the network parameter is below a predetermined threshold value, generating a request to blur the background of the video; and
    if the network parameter is above the predetermined threshold value, generating a request to transmit the video without blurring.

16. The method of claim 15, wherein the network parameter includes a bit rate or a network bandwidth.

17. The method of claim 1, further comprising:
    dynamically determining a value related to quality of service associated with a communications network;
    based on the determining, if the value associated with the quality of service is within a first predetermined range, generating a first request to blur only the background of the video;
    based on the determining, if the value associated with the quality of service is within a second predetermined range, generating a second request to blur the background of the video and other parts of the video excluding a user face; and based on the determining, if the value associated with the quality of service is within a third predetermined range, no request to blur the background is generated; and wherein the first range differs from the second range and the third range, and wherein the second range differs from the third range and the first range.

18. The method of claim 1, further comprising receiving the video including a sequence of images; and detecting the shape unit and the position vector of the foreground object, and the intensity vector of the shape unit, the feature reference point representing a parameter of a face of the foreground object, and wherein the detecting includes applying an Active Shape Model algorithm to areas of the images associated with the foreground object.

19. A system comprising:

a computing device including at least one processor and a memory storing processor-executable codes, which, when implemented by the at least one processor, cause to perform the steps of:

identifying a foreground object in one or more images in a video, the foreground object comprising a feature reference point;

identifying a background in each of the one or more images in the video by forming a binary mask aligned to the foreground object, inverting the binary mask to select an area not associated with the foreground object, and separating the foreground object from each of the one or more images in the video based on a shape unit, a position vector, and an intensity vector of the shape unit associated with the foreground object, the position vector corresponding to a rotation and translation around three axes orthogonal to the foreground object and the shape unit corresponding to a vertical position of the feature reference point identified in the foreground object;

determining a gray value intensity of a plurality of pixels associated with the foreground object;

comparing the gray value intensity of each of the plurality of pixels with the feature reference point;

based on the comparison, determining object pixels associated with the foreground object and applying a binary morphological closing function to the object pixels;

tracking the foreground object comprising the object pixels in the video based on the shape unit, the position vector, and the intensity vector; and modifying the background in the video and the foreground object in the video separately based on the tracking of the foreground object to generate a modified video in which the foreground object and the modified background are at different image qualities.

20. A non-transitory processor-readable medium having instructions stored thereon, which when executed by one or more processors, cause the one or more processors to implement a method, comprising:

identifying a foreground object in one or more images in a video, the foreground object comprising a feature reference point;

identifying a background in each of the one or more images in the video by forming a binary mask aligned to the foreground object, inverting the binary mask to select an area not associated with the foreground object, and separating the foreground object from each of the one or more images in the video based on a shape unit, a position vector, and an intensity vector of the shape unit associated with the foreground object, the position vector corresponding to a rotation and translation around three axes orthogonal to the foreground object and the shape unit corresponding to a vertical position of the feature reference point identified in the foreground object;

determining a gray value intensity of a plurality of pixels associated with the foreground object;

comparing the gray value intensity of each of the plurality of pixels with the feature reference point;

based on the comparison, determining object pixels associated with the foreground object and applying a binary morphological closing function to the object pixels;

tracking the foreground object comprising the object pixels in the video based on the shape unit, the position vector, and the intensity vector; and modifying the background in the video and the foreground object in the video separately based on the tracking of the foreground object to generate a modified video in which the foreground object and the modified background are at different image qualities.

* * * * *